(12) United States Patent  (10) Patent No.: US 8,270,669 B2
Aichi et al.  (45) Date of Patent: Sep. 18, 2012

(54) APPARATUS FOR EXTRACTING OPERATING OBJECT AND APPARATUS FOR PROJECTING OPERATING HAND

(75) Inventors: Isao Aichi, Toyota (JP); Tetsuya Oki, Nagoya (JP)

(73) Assignee: DENSO CORPORATION, Kariya (JP)

( * ) Notice: Subject to any disclaimer, the term of this patent is extended or adjusted under 35 U.S.C. 154(b) by 856 days.

(21) Appl. No.: 12/320,840

(22) Filed: Feb. 5, 2009

(65) Prior Publication Data

US 2009/0195372 A1  Aug. 6, 2009

(30) Foreign Application Priority Data

Feb. 6, 2008  (JP) .................................. 2008-25874
Mar. 19, 2008  (JP) .................................. 2008-70864

(51) Int. Cl.
*G06K 9/00* (2006.01)
*G06K 9/46* (2006.01)
*G06K 9/36* (2006.01)
(52) U.S. Cl. .................... 382/103; 382/190; 382/284
(58) Field of Classification Search .................. 382/104, 382/284, 124, 282, 103, 190; 701/200, 208, 701/400, 408; 345/173
See application file for complete search history.

(56) References Cited

U.S. PATENT DOCUMENTS

| | | | | |
|---|---|---|---|---|
| 5,731,979 A * | 3/1998 | Yano et al. | ..................... | 701/455 |
| 7,840,347 B2 * | 11/2010 | Noguchi | ....................... | 701/418 |
| 8,032,298 B2 * | 10/2011 | Han | .............................. | 701/455 |
| 8,049,722 B2 * | 11/2011 | Kumon | ......................... | 345/158 |
| 2007/0230929 A1 | 10/2007 | Niwa et al. | | |
| 2008/0231608 A1 | 9/2008 | Nagata | | |
| 2009/0002342 A1 * | 1/2009 | Terada et al. | ................. | 345/175 |

FOREIGN PATENT DOCUMENTS

| JP | A-10-269012 | 10/1998 |
|---|---|---|
| JP | A-11-25260 | 1/1999 |
| JP | A-2000-6687 | 1/2000 |
| JP | A-2000-40147 | 2/2000 |
| JP | A-2007-276615 | 10/2007 |
| JP | A-2007-286667 | 11/2007 |
| JP | A-2007-286696 | 11/2007 |
| JP | A-2008-158675 | 7/2008 |

* cited by examiner

*Primary Examiner* — Daniel Mariam
(74) *Attorney, Agent, or Firm* — Posz Law Group, PLC

(57) ABSTRACT

An operating object extraction apparatus uses a camera, a light, a memory, an operation panel, a hand detector, a capture controller, and an image controller for displaying an operating object such as an operating finger of an operator's hand, when the operating object extraction apparatus is used in combination with a navigation apparatus in a vehicle for remotely controlling the navigation apparatus by an input from the operation panel that that is disposed separately from the navigation apparatus. The operating finger of the operator's hand is displayed as a finger image on the display unit under control of the capture controller and the image controller in a manner that a finger tip of the operating finger occupies only a small portion relative to the size of the operation panel.

22 Claims, 27 Drawing Sheets

APPARATUS FOR EXTRACTING OPERATING OBJECT AND APPARATUS FOR PROJECTING OPERATING HAND

CROSS REFERENCE TO RELATED APPLICATION

The present application is based on and claims the benefit of priority of Japanese Patent Applications No. 2008-25874, filed on Feb. 6, 2008, and No. 2008-70864, filed on Mar. 19, 2008, the disclosure of which are incorporated herein by reference.

FIELD OF THE INVENTION

The present disclosure generally relates to an operating object extraction apparatus and an operating hand projection apparatus for use in a vehicle.

BACKGROUND INFORMATION

Conventionally, operating object extraction apparatuses are disclosed, for example, in a Japanese patent document JP-A-2007-272596, in which the apparatus has an operation panel disposed separately from a display unit of a vehicular device and displays, as finger images of an operating hand on the display unit in a superposing manner, operating fingers on the operation panel captured by a camera for the purpose of enabling a remote control of the vehicular device. The operating object extraction apparatus of this kind uses the camera and a lighting device disposed on an opposite side of the operation panel relative to the operating fingers for capturing the finger images. The finger images are captured in a lighted condition and a non-lighted condition so that the difference of two conditions is recognized for imaging. The operating object extraction apparatus described above uses the difference image to extracts the operating object, that is, the finger images of the operating hand, thereby enabling the finger images not to suffer from the influence of external lights.

However, downsizing of the operation panel of the apparatus are desired in order to shrink the length of the operation strokes on the operation panel. Further, by reducing the size of the operation panel, the apparatus itself can also be reduced in size. The drawback of the size reduction of the operation panel of the apparatus is that a ratio of the operator's finger size against the size of the operation panel increases. As a result, the finger images displayed on the display panel of the vehicular device such as a display panel of a navigation apparatus occupies an increased portion of a display area of the display panel, thereby deteriorating, for the operator, the operability and/or intelligibility of the operation performed on the operation panel as shown in FIG. 20.

In view of the above problems, a prior art (JP-A-2008-158675) discloses a technique that calculates a finger tip position based on the extracted finger image, and displays a finger-shape figure at the calculated finger tip position. However, in the disclosure of JP-A-2008-158675, the finger shape, in particular the outline of the finger shape, is lost from the resulting finger-shape figure, thereby not leading to a satisfactorily intuitive finger-shape display, even though the finger-shape figure having a narrower profile than the real finger can be displayed. That is, the finger shape altered from the actual shape may not intuitively convey the operation facilitating information, thereby not leading to an improvement of the operability.

Further, when an operation panel or a touch panel is disposed closer with a user relative to a display unit of a vehicular apparatus in a vehicle for the ease of operation of a menu screen that is displayed on the display unit of the vehicular apparatus, user's hand is captured by a camera and is displayed as a hand image on the display unit in a superposing manner on top of the menu screen. For example, Japanese patent documents JP-A-H10-269012 and JP-A-2000-6687 disclose such apparatuses.

However, the user does not necessarily watch the touch panel carefully, thereby making it difficult for the user him/herself to intuitively recognize or understand which part of the user's hand (e.g., which one of the multiple fingers of the user's hand) is going to touch the touch panel. In addition, the user may be confused which one of the user's fingers should be used for a touch operation for, for example, selecting a menu button in the menu screen.

SUMMARY OF THE INVENTION

In view of the above and other problems, the present invention provides an operating object extraction apparatus that enables a size reduction of an operation panel without compromising operability of the apparatus. Further, the present invention provides an operating hand projection apparatus that enables an easy and intuitive recognition of user's hand and/or user's fingers in an image that is superposingly displayed on a display unit in terms of the ease of operation such as which one of multiple fingers to be used or the like on a touch panel separately disposed from the display unit.

In an aspect of the present disclosure, the operating object extraction apparatus for use in a vehicle includes: a display unit for displaying various images; an operation panel for receiving operation of an operator, wherein the operation panel is separately disposed from the display unit for providing a remote control; and a control unit for generating a finger image on the display unit based on an operator finger captured by a camera on the operation panel. The control unit controls a ratio A of the operator finger against a panel size of the operation panel to be greater than a ratio B of the finger image against a size of the display unit.

The operating object extraction apparatus of the present invention generates the finger image in size that has a reduced value of finger-size-to-panel-size ratio. Therefore, the finger image superposingly displayed, on a menu selection screen of a navigation apparatus for example, on the display unit occupies a smaller portion of the display area, thereby enabling the preferable operability of the operation panel even when the size of the operation panel is reduced.

In another aspect of the present invention, the operating hand projection apparatus includes: a touch panel separately disposed from a display unit for receiving an input of a position on a screen of the display unit; a camera for imaging a hand that is held at a proximity of a touch surface of the touch panel; and a display controller for displaying, in an operation reception image on the display unit, a hand image derived from the camera in a superposing manner. The display controller of the apparatus selects one of a plurality of fingers in the hand image derived from the camera as a marker finger, and the marker finger selected by the display controller is marked by a selection mark at a tip of the finger in the hand image.

The operating hand projection apparatus selects, as a marker finger, one of the multiple fingers in a hand image captured by the camera, and the hand image superposingly displayed on the display unit of the apparatus has one selected finger that is, the marker finger from among the multiple fingers, exclusively marked by a marker at a tip portion of the selected finger in the hand image. The marker attached to the marker finger may be a geometrical figure, or a design pattern of some kind.

By displaying the marker at the tip of the marker finger, the user can recognize which part of the marker finger is touching on the touch panel in advance. Further, the marker finger marked by the marker may be a single finger from among the multiple fingers displayed on the display unit, thereby enabling the user to easily identify which one of the multiple fingers should be used for operation.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
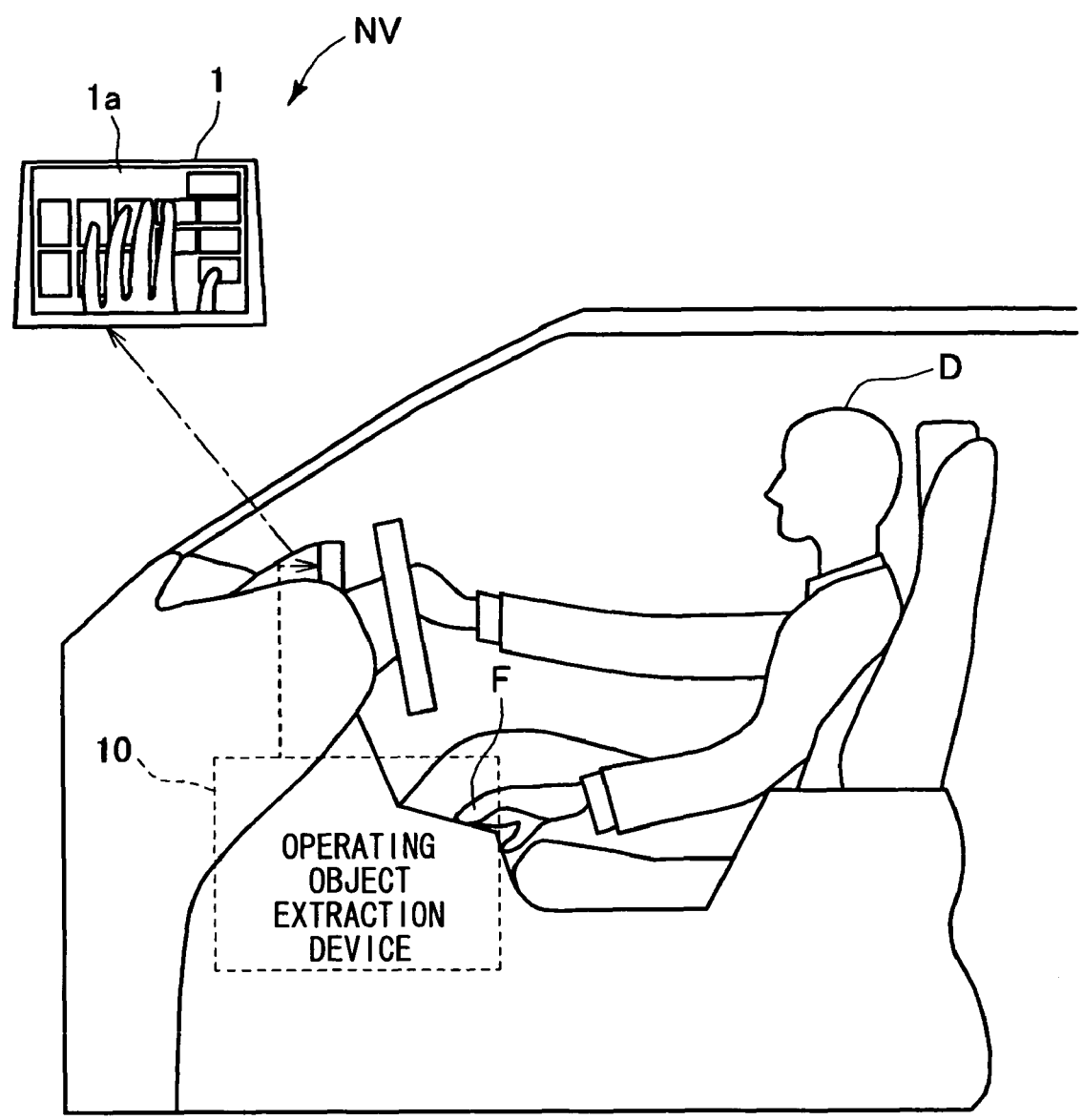
FIG. 1 is an illustration of a car navigation apparatus including an operating object extraction apparatus of the present invention.

The first embodiment of the present invention is explained with reference to the drawings in the following. FIG. 1 is a schematic illustration of a car navigation apparatus NV including an in-vehicle operating object extraction apparatus regarding the present invention. The car navigation apparatus NV includes a display unit 1, and an operating object extraction apparatus 10.

The display unit 1 (a display part) has a liquid crystal panel 1a, and it is disposed in a front part of the vehicle compartment to be viewable by a vehicle driver D. The display unit 1 displays a vehicle symbol for navigation on a map, and various information such as traffic information is provided for the vehicle driver D from the display unit 1.

Figure 2:
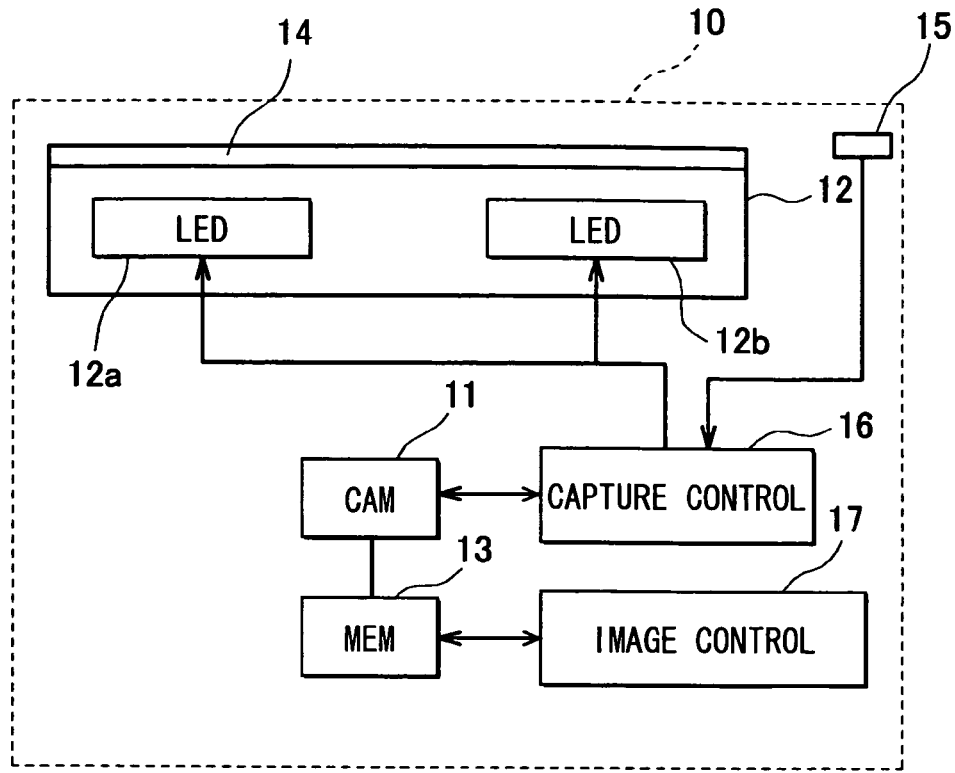
FIG. 2 is a block diagram of the operating object extraction apparatus in FIG. 1.
Figure 3:
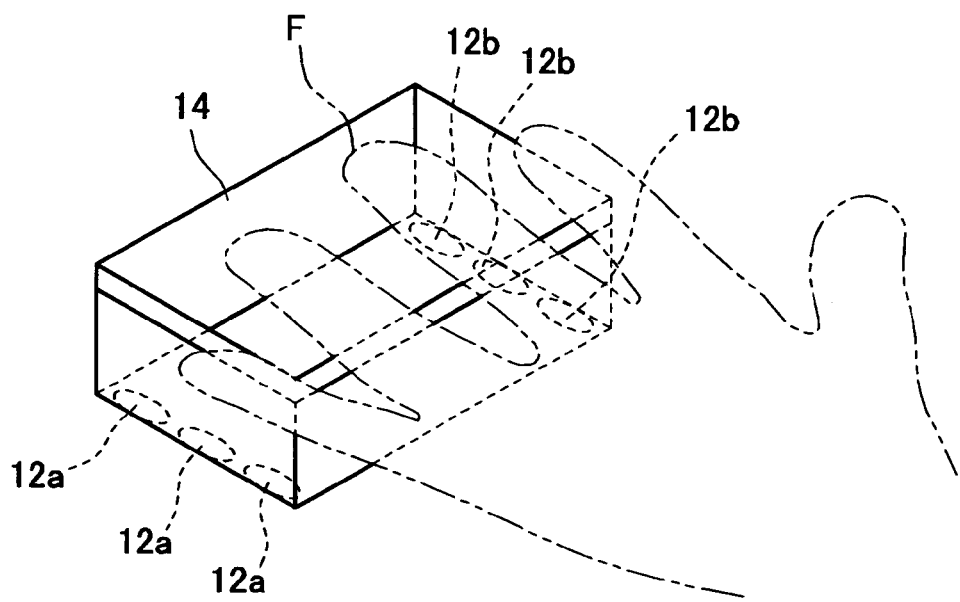
FIG. 3 is a perspective view of a driver's finger put on an operation panel of the apparatus in FIG. 2.

The operating object extraction apparatus 10 has a function to remotely control the car navigation apparatus NV, and a finger-tip image of the vehicle driver D (an operator) in the liquid crystal panel 1a of the display unit 1. The operating object extraction apparatus 10 has a camera 11 (an imaging device), a lighting unit 12, a memory 13 (a storage unit), an operation panel 14, a hand detector 15 (an operating object detection unit), a capture control unit 16 (an exposure controller) and an image control unit 17 as shown in FIG. 2 and FIG. 3.

The camera 11 is capable of capturing an infrared image, and includes an image pickup device to photograph a visible image, a reflecting mirror reflecting infrared light, a lens collecting infrared light, a wavelength conversion device which, for example, utilizes a nonlinear optics material to convert infrared light into visible light together with other parts. The camera 11 is disposed at a bottom side of the operation panel 14 to photograph the other side of the finger-tip F of the vehicle driver D relative to the externally-lighted side of the finger onto which an outside light is projected. In addition, as for the camera 11, a focus is set so that a photographed finger-tip image has substantially the same size as a real finger-tip.

The lighting unit 12 is, for example, a device capable of emitting infrared light such as an infrared LED, and includes a left light 12a for lighting the finger-tip F from the lower left side and a right light 12b for lighting the finger-tip F from the lower right side. In FIG. 3, three pieces of lights 12a and lights 12b are shown as an example. In FIG. 2, the memory 13 is used to stored image data derived from the camera 11, and the memory 13 is capable of storing data of plural number of pictures.

The operation panel 14 is incorporated in a center console box, and is used for an input operation by the finger-tip F of the vehicle driver D. The operation panel 14 is formed with materials such as, for example, an acrylic board that is capable of letting infrared rays go therethrough, and the area size of the panel is equal to or smaller than half the size of the liquid crystal panel 1a of the display unit 1. That is, for example, the ratio of the panel 14 and the panel 1a is 60:150.

The hand detector 15 uses a micro-switch and/or a pressure-sensitive sheet to be pressed down by the palm or the wrist of the driver D when the finger-tip F of the vehicle driver D is placed on the operation panel 14. When a hand of vehicle driver A is detected, the hand detector 15 outputs an on signal to the capture control unit 16.

The capture control unit 16 (a control unit, an exposure controller) controls the lights 12a, 12b of the lighting unit 12, and photographing by the camera 11. The capture control unit 16 includes a microcomputer equipped with a CPU, a ROM, a RAM, and an input/output (I/O) as its main component (not illustrated). The capture control unit 16 repeatedly executes a photography control program of FIG. 4 memorized by the ROM or the like based on the on signal from the hand detector 15.

The image control unit 17 (a control unit, an image generator) generates a finger-tip image based on photography image data of the camera 11 memorized in the memory 13. The image control unit 17 includes a microcomputer equipped with a CPU, a ROM, a RAM, and an input/output (I/O) as its main component (not illustrated). The image control unit 17 repeatedly executes an image processing program of FIG. 5 memorized by the ROM or the like.

Figure 4:
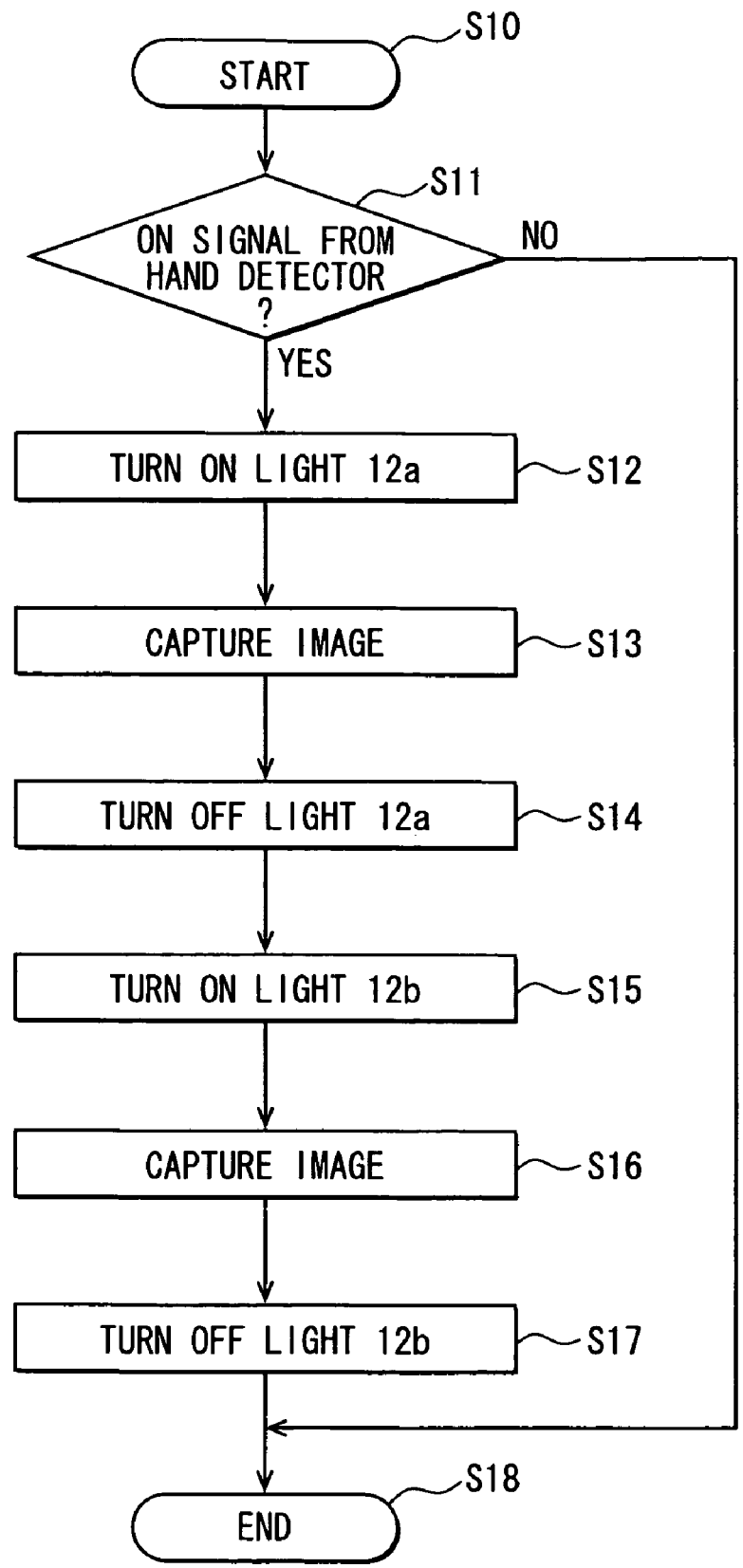
FIG. 4 is a flow chart of a photography control program in a first embodiment of the present invention.

The operation of the apparatus in the first embodiment constituted as described above is explained. When an occupant of the vehicle operates an ignition key to turn on an ignition switch, the photography control program of FIG. 4 is executed repeatedly at a short interval by the capture control unit 16.

As for this photography control program, the process starts in step S10. If the finger-tip F of the vehicle driver D is not put on the operation panel 14, the imaging control program is once finished in step S18 due to an off sensor signal from the hand detector 15 (step S11:No).

On the other hand, if the finger-tip F of the vehicle driver D is put on the operation panel 14 and the palm/wrist of the driver D is detected by the hand detector 15, the sensor signal from the detector 15 is turned on (step S11:Yes) and the processing after step S12 are carried out. The capture control unit 16 sets a photography timing of the camera 11 at an appointed cycle as shown in FIG. 6 in the processing after step S12, and alternately turns on the light 12a and the light 12b at the photography timing.

Figure 6:
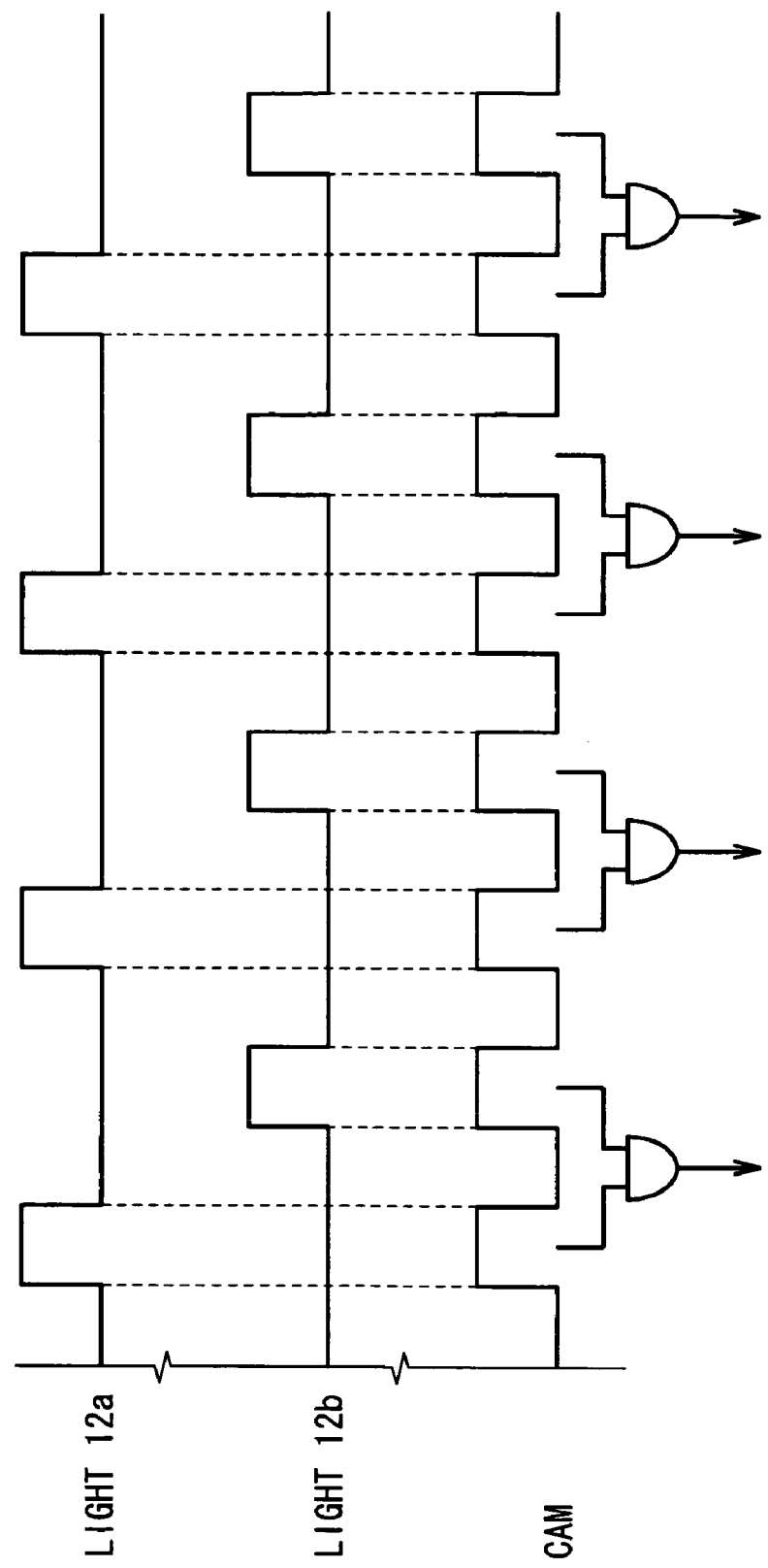
FIG. 6 is a time chart of turning on/off of each light in association with photography timings of a camera in the first embodiment of the present invention.
Figure 7A:
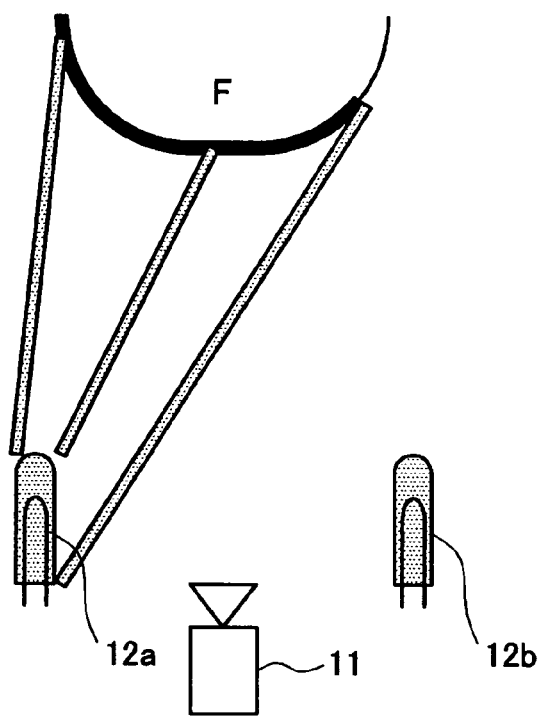
FIGS. 7A and 7B are illustrations of a left light lighted condition and a right light lighted condition.
Figure 7B:
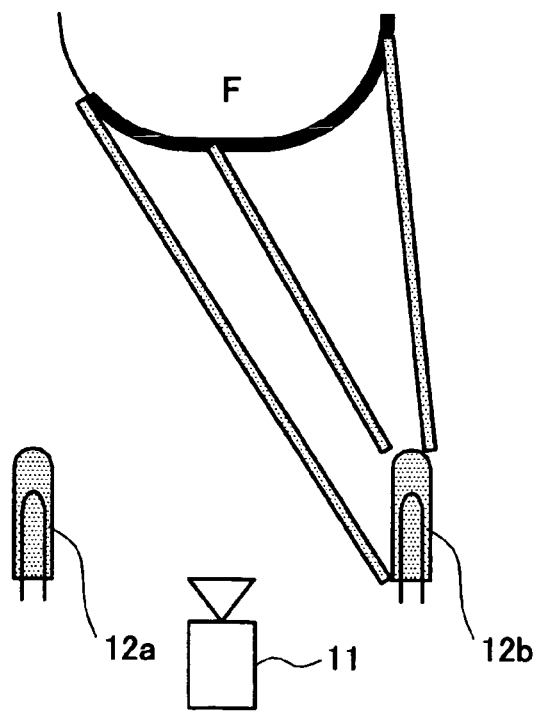

More practically, as shown in FIG. 6 and FIG. 7A, only the light 12a is turned on at the photo timing of the camera 11 (step S12), and the camera 11 photographs the finger-tip F in a lighting state only by the light 12a (step S13). The photography image data of this time is memorized as a left light lighted image (a first finger-tip image) in an appointed area of the memory 13. Then, only the light 12b is turn on (step S15) with the light 12a turned off (step S14) as shown in FIG. 6 and FIG. 7B, and the camera 11 photographs the finger-tip F in a lighting state only by the light 12b (step S16). The photography image data of this time is memorized as a right light lighted image (a second finger-tip image) in an appointed area of the memory 13. After step S16, the light 12b is turned off (step S17), and the photography control program is once finished in step S18. Then, processing of steps S12 to S17 is repeatedly carried out while the sensor signal from the hand detector 15 is on.

Figure 5:
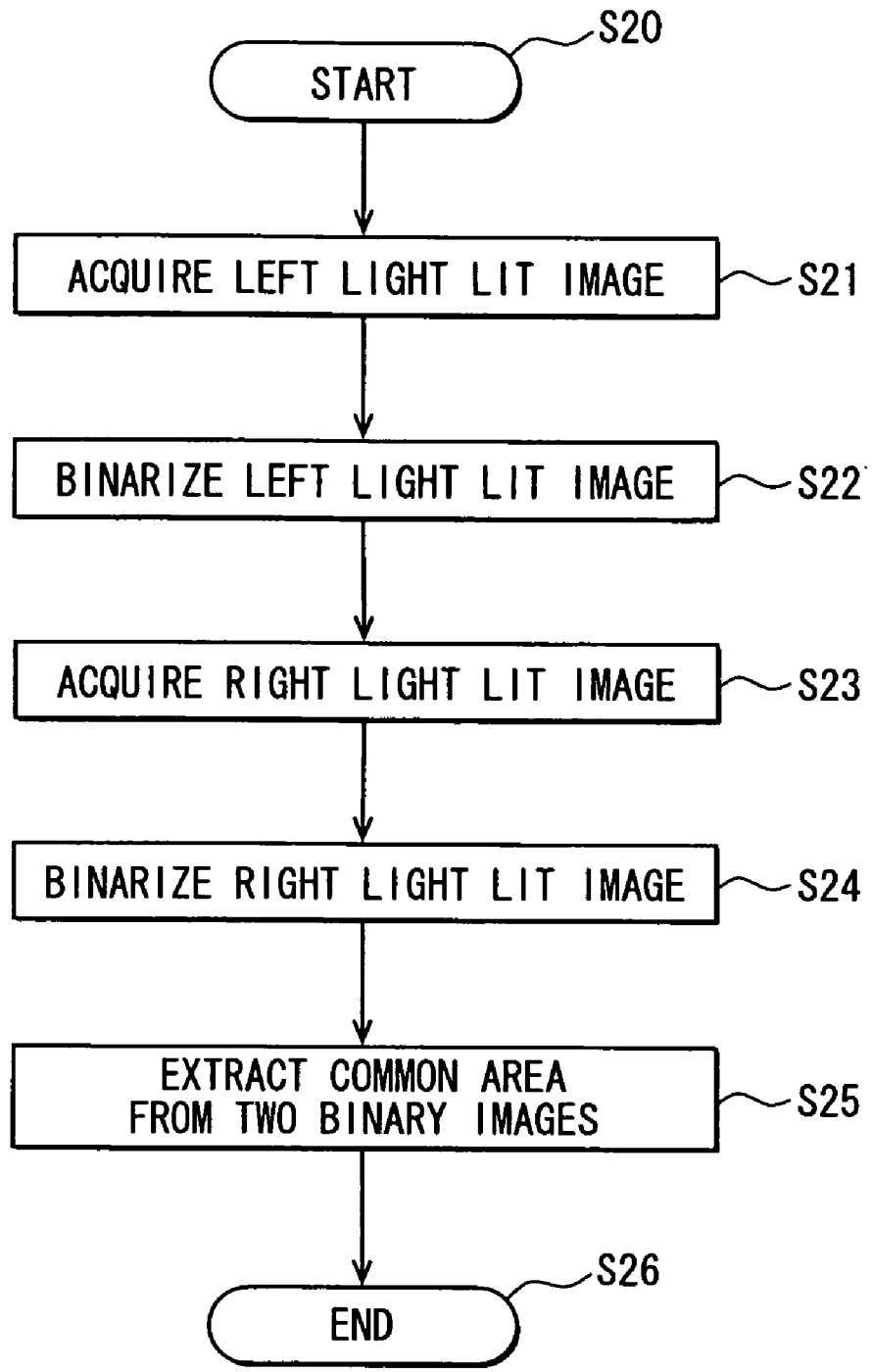
FIG. 5 is a flow chart of an image processing program in the first embodiment of the present invention.
Figure 8A:
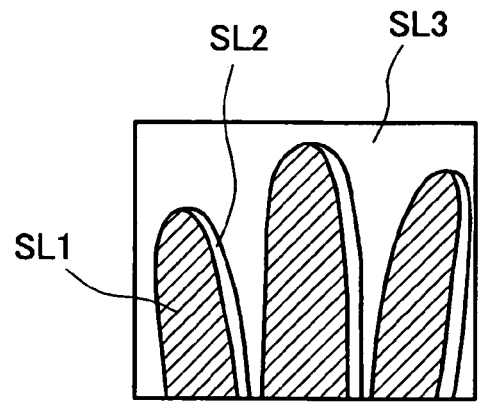
FIGS. 8A to 8C are illustrations of a left light lighted image, a right light lighted image, and a common part extracted image from the left and right light lighted images.

An image processing program of FIG. 5 is repeated at a short interval by the image control unit 17, in parallel with the photography control program of FIG. 4 by the capture control unit 16. The image processing program starts at step S20. First, a left light lighted image memorized in the memory 13 is acquired (step S21), and binarization of the acquired image is performed (step S22). More practically, from among three parts that are lighted by the light 12a, that is, from among a high brightness part SL1 of the finger-tip F, a low brightness part SL2 in the shade on the right side of the finger-tip F, and a background part SL3 that serves as a background of the finger-tip F, only the high brightness part SL1 is extracted as shown in FIG. 8A.

Figure 8B:
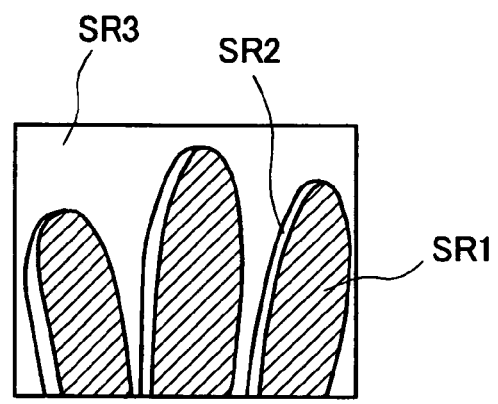
Figure 8C:
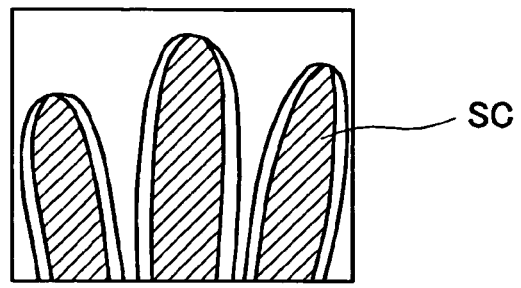

Then, a right light lighted image memorized in the memory 13 is acquired (step S23), and binarization of the acquired image is performed (step S24). More practically, from among three parts that are lighted by the light 12b, that is, from among a high brightness part SR1 of the finger-tip F, a low brightness part SR2 in the shade on the left side of the finger-tip F, and a background part SR3 that serves as a background of the finger-tip F, only the high brightness part SR1 is extracted as shown in FIG. 8B. Finally, a common area SC is extracted from both of the high brightness part SL1 and high brightness part SR1 as shown in FIG. 8C (step S25). After step S25, the image processing program is finished in step S26.

Figure 9:
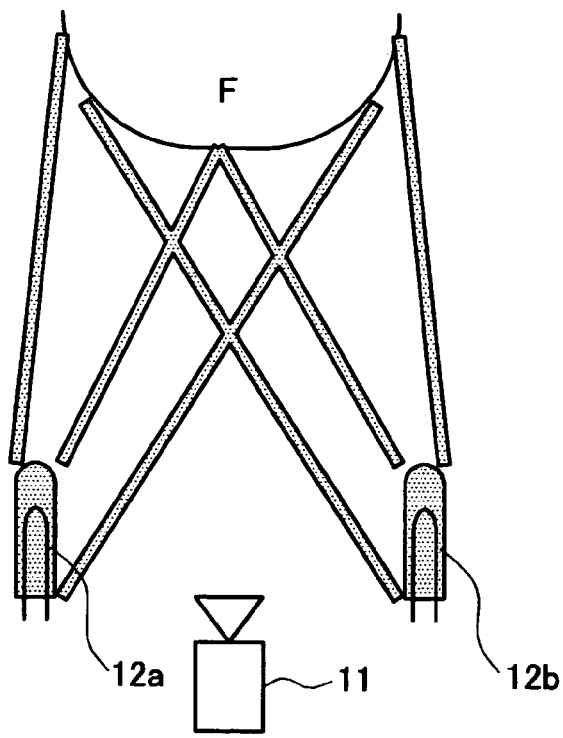
FIG. 9 is an illustration of a both lights lighted condition.
Figure 10:
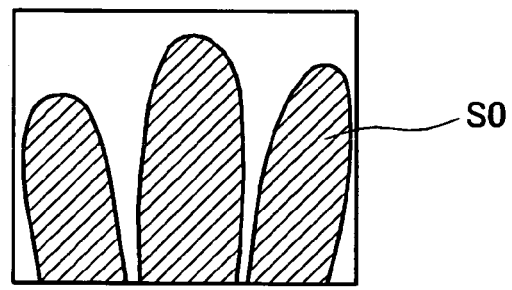
FIG. 10 is an illustration of a both lights lighted image.

According to the present embodiment, by performing a simple image processing shown in FIG. 5, the finger-tip image is "slimmed" (i.e., reduced in size) in comparison to the extracted area S0 (after binarization) of the finger-tip images that are photographed in a state that both of the lights 12a, 12b are turned on, for example, as shown in FIG. 9 and FIG. 10.

Figure 11:
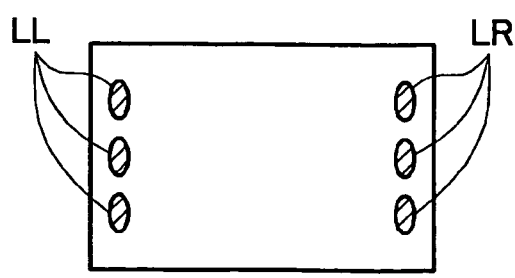
FIG. 11 is an illustration of light images showing up on the operation panel.
Figure 12A:
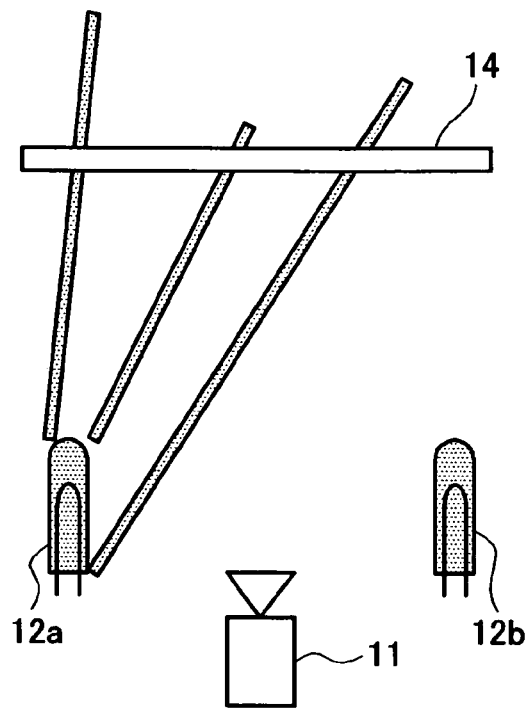
FIGS. 12A and 12B are illustrations of only a left light lighted condition and only a right light lighted condition.
Figure 12B:
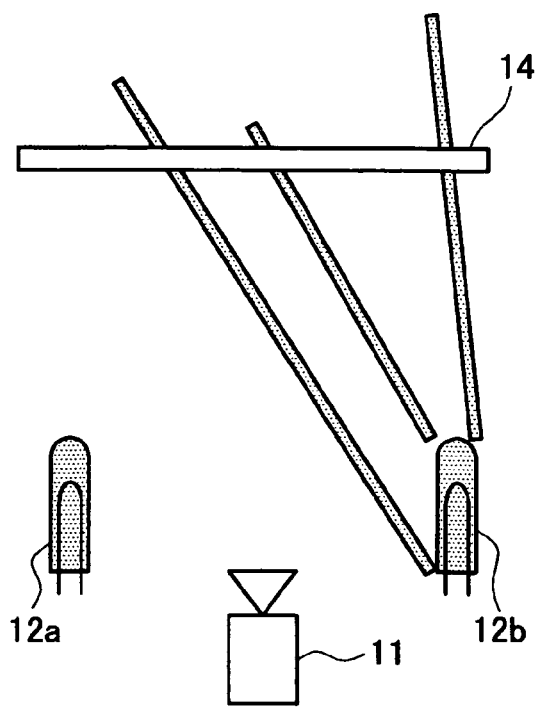
Figure 13A:
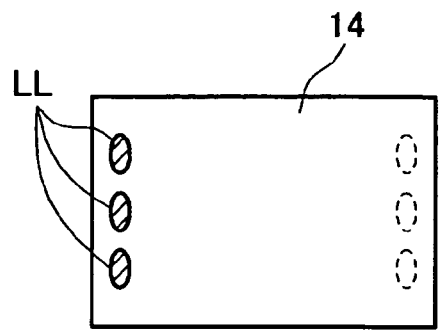
FIGS. 13A to 13C are illustrations of a light image in the left light lighted condition, a light image in the right light lighted condition, and a display image after extracting a common part from the two light images.
Figure 13B:
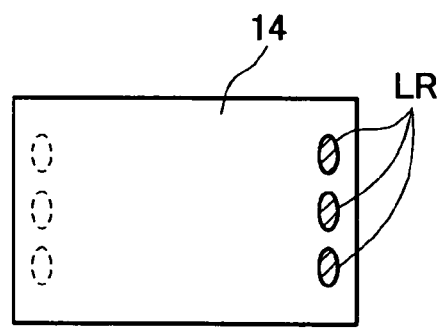
Figure 13C:
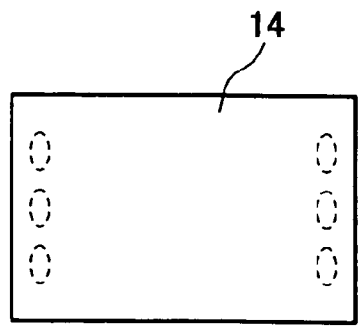

In addition, when both of the lights 12a, 12b are turned on as shown in FIG. 9, light images LL, LR of the both lights 12a, 12b show up on the operation panel 14 as shown in FIG. 11. Because light images LL, LR both have high brightness values, those light images LL, LR are likely to be extracted as the finger-tip images by the conventional method. However, by using the method of the present embodiment, the light image LL, in the left light lighted image in FIG. 12A/13A that is acquired with only the light 12a turned on, and the light image LR, in the right light lighted image in FIG. 12B/13B that is acquired with only the light 12b turned on, do not have a common part due the position deference between the image LL and the image LR showing up on the operation panel 14. Therefore, the processing in S25 in FIG. 5 successfully prevents the light images LL, LR caused by the lights 12*a*, 12*b* from being extracted as the finger-tip image F (See FIG. 13C).

Second Embodiment

In the first embodiment, the capture control unit 16 is configured to carry out the photography control program of FIG. 4, and the image control unit 17 is configured to carry out the image processing program of FIG. 5. However, the capture control unit 16 may be configured to carry out a photography control program of FIG. 14, and the image control unit 17 may be configured to carry out an image processing program of FIG. 15. Other configurations of the present embodiment are same as the ones in the first embodiment.

Figure 14:
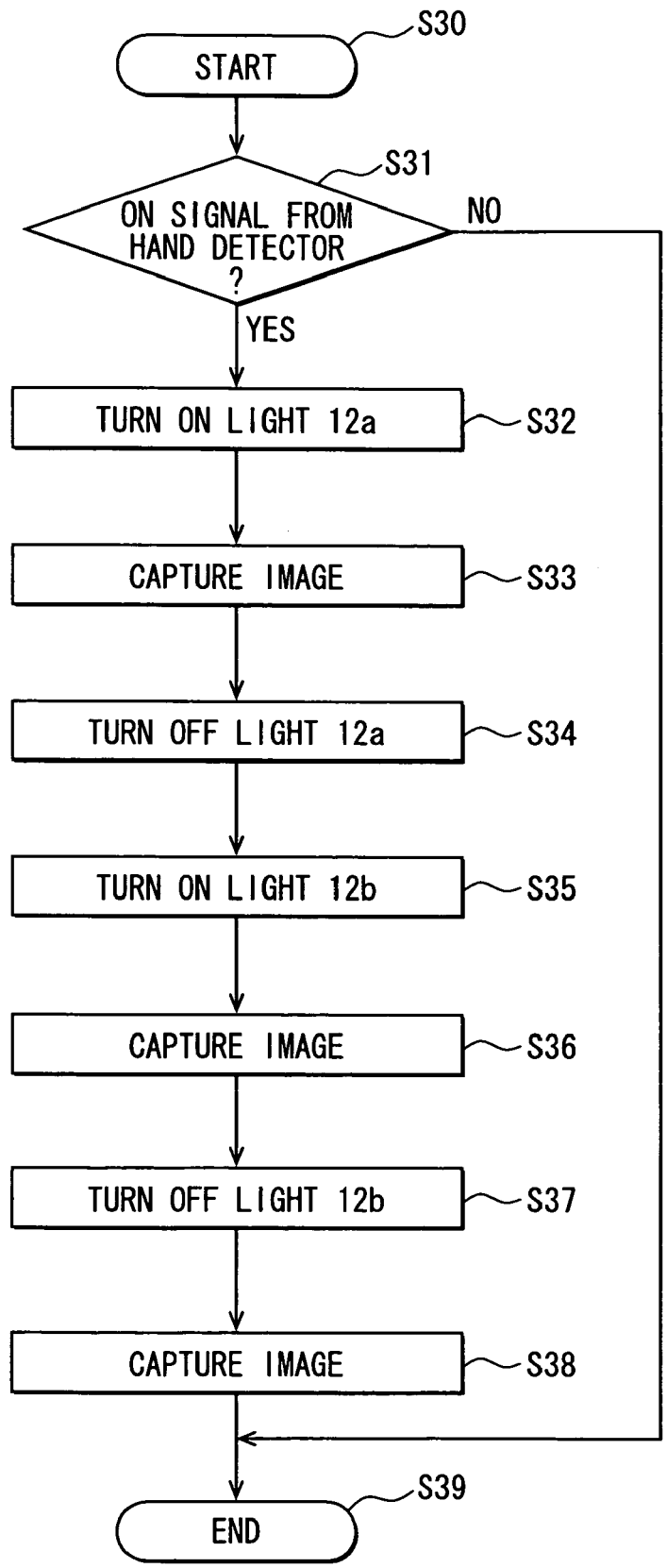
FIG. 14 is a flow chart of the photography control program in a second embodiment of the present invention.

In the present embodiment, the finger-tip image at a time when both of the lights 12*a*, 12*b* are turned off is acquired in addition to the finger-tip images acquired at times when each of the lights 12*a*, 12*b* is turned on. A photography control program of FIG. 14 is explained first.

As for the photography control program, the process is started in step S30.

When a palm or a wrist of the vehicle driver D is detected by the hand detector 15, the sensor signal from the hand detector 15 is turned to on (step S31:Yes), and processing after step S32 is carried out. In the processing after step S32, the capture control unit 16 sets a photography timing of the camera 11 in a predetermined cycle as shown in FIG. 16, and, alternately turns on the light 12*a* and the light 12*b* in turn at the photography timing.

Figure 15:
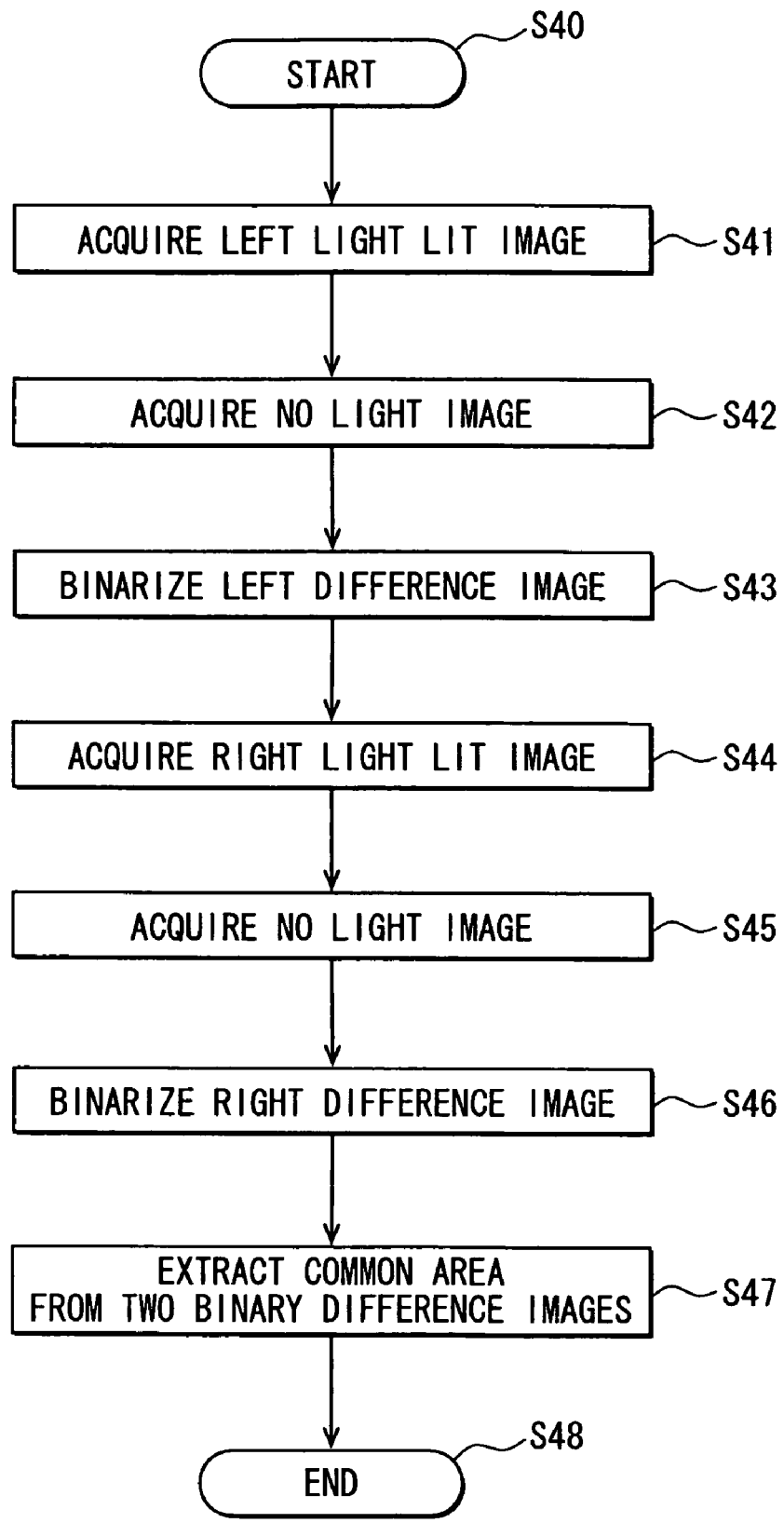
FIG. 15 is a flow chart of the image processing program in the second embodiment of the present invention.
Figure 16:
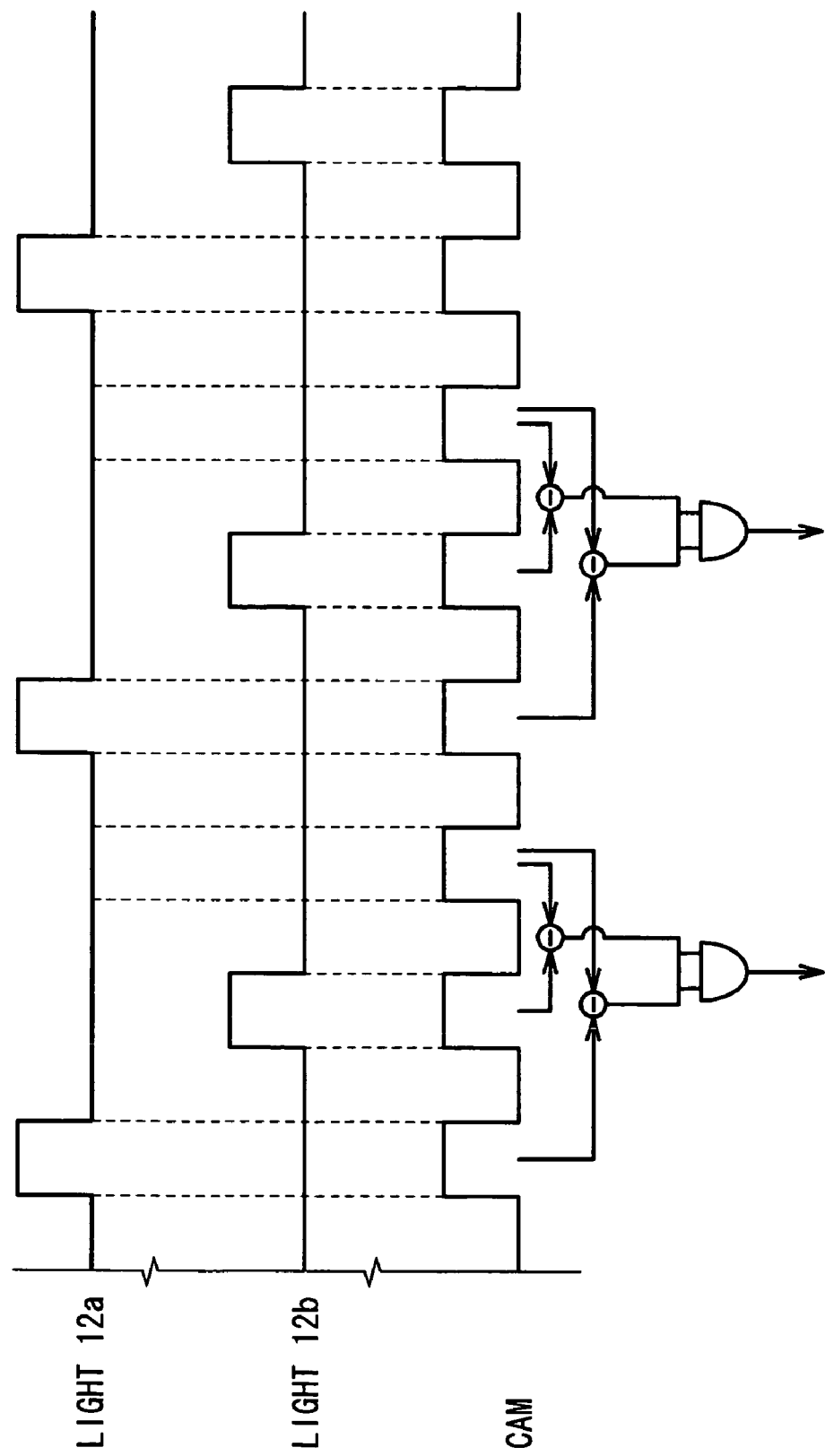
FIG. 16 is a time chart of turning on/off of each light in association with photography timings of a camera in the second embodiment of the present invention.

More practically, as shown in FIG. 7A and FIG. 16, in synchronization with the photography timing of the camera 11, the light 12*a* is turned on first (step S32), and the camera 11 is controlled to photograph the finger-tip image F in a lighting state only by the light 12*a* (step S33). The photography image data is memorized as a left light lighted image (i.e., the first finger-tip image) in the appointed area of the memory 13. Then, after turning off the light 12*a* (step S34), only the light 12*b* is turned on as shown in FIG. 7B and FIG. 16 (step S35), and the camera 11 is controlled to photograph the finger-tip F in a lighting state only by the light 12*b* (step S36). The photography image data is memorized as a right light lighted image (i.e., the second finger-tip image) in the appointed area of the memory 13. Then, the light 12*b* is turned off (step S37), and the camera 11 is controlled to photograph the finger-tip F in a state that both of the lights 12*a*, 12*b* are turned off (step S38). The photography image data is memorized as a both lights extinguished image (i.e., a third finger-tip image: no light image in FIG. 15) in the appointed area of the memory 13. After step S38, the photography control program is once finished in step S39. Further, while the sensor signal from the hand detector 15 is in an on condition, processing of steps S31 to S38 is repeatedly executed.

An image processing program of FIG. 15 is repeated at a short interval by the image control unit 17, in parallel with the photography control program of FIG. 14 by the capture control unit 16. The process of the program is started in step S40, and the process acquires the left light lighted image memorized in the memory 13 (step S41), and then the process acquires the both lights extinguished image memorized in the memory 13 (step S42).

Then, the brightness values of corresponding parts in both of the images acquired respectively in step S41 and in step S42 are differentiated, that is, the absolute value of the brightness difference is calculated. Then, binarization of the image is performed based on a predetermined brightness value as a standard, to acquire a binarized left difference image (i.e., a first binarized difference image) (step S43).

Likewise, the process acquires the right light lighted image at memorized in the memory 13 (step S44), and then the process acquires the both lights extinguished image memorized in the memory 13 (step S45). Then, the brightness values of corresponding parts in both of the images acquired respectively in step S44 and in step S45 are differentiated, that is, the absolute value of the brightness difference is calculated. Then, binarization of the image (i.e., representing the image by using binary codes of 0's and 1's for example) is performed based on a predetermined brightness value as a standard, to acquire a binarized right difference image (i.e., a second binarized difference image) (step S46). Finally, a common part of both of the binarized difference images is extracted (step S47). After step S47, the image processing program is finished in step S48.

According to the present embodiment, without regard to the luminous intensity of the outside, a clear outline of the left side finger-tip image is acquired by the processing in step S43, and also a clear outline of the right side finger-tip image is acquired by the processing in step S46. As a result, based on both of the finger-tip images that have a clear outline, a slimmed finger-tip image can be generated.

Third Embodiment

Figure 17:
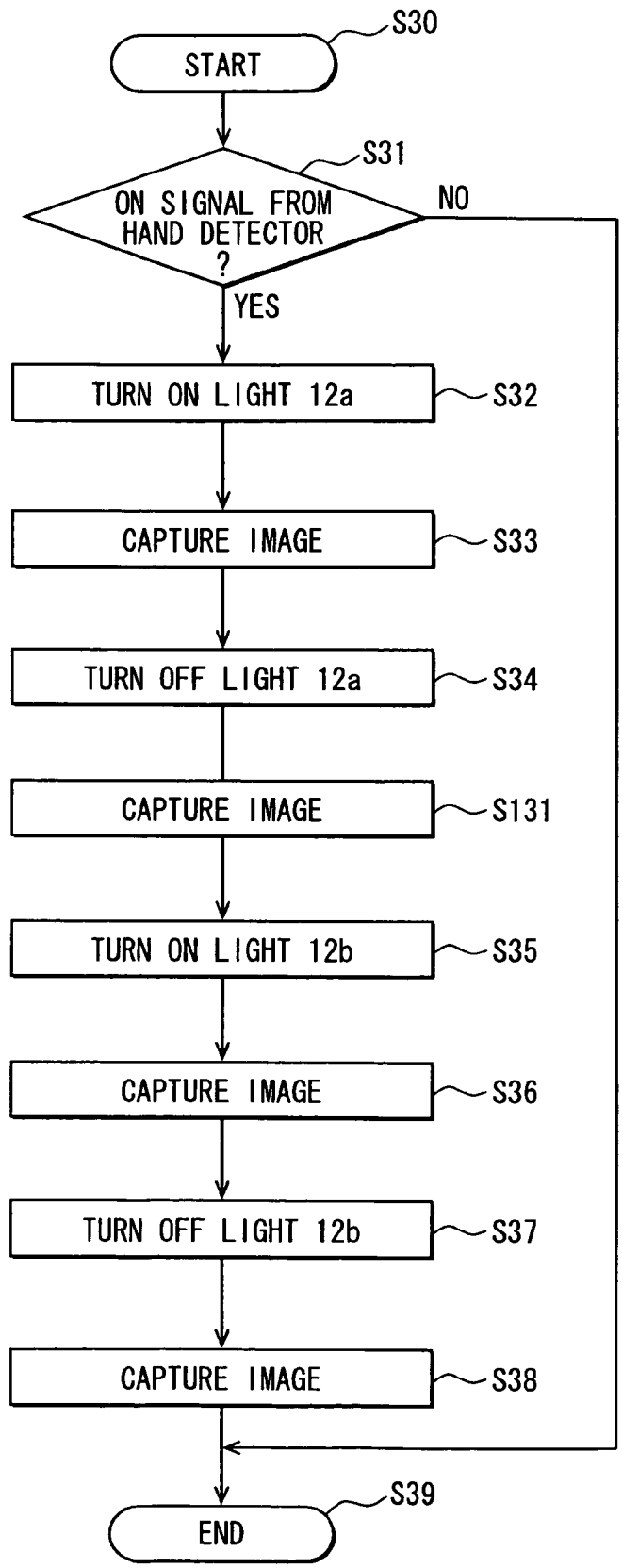
FIG. 17 is a flow chart of the photography control program in a third embodiment of the present invention.
Figure 18:
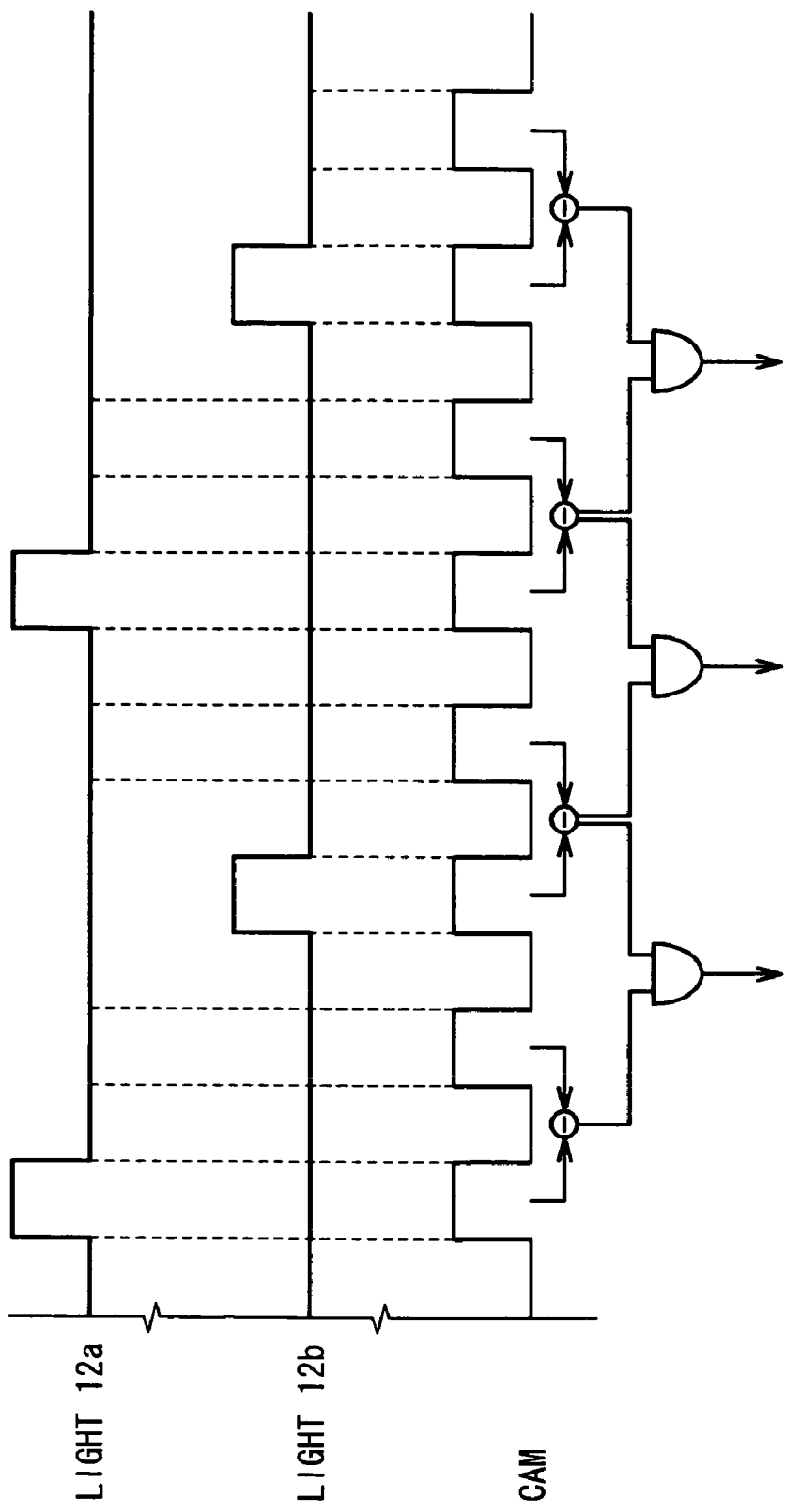
FIG. 18 is a time chart of turning on/off of each light in association with photography timings of a camera in the third embodiment of the present invention.

The photography control program in FIG. 14 executed by the capture control unit 16 may be replaced with the program in FIG. 17 for acquiring the binarized left difference image and the binarized right difference image by the camera 11 respectively at two steps as shown in FIG. 18.

The photography control program of FIG. 17 is different from the photography control program of FIG. 14 at the point that processing of step S131 is inserted between step S34 (light 12*a* turn off control) and step 35 (light 12*b* turn on control). In other words, while the both lights extinguished image is acquired by the processing only in step S38 in the program of FIG. 14, the programs of FIG. 17 acquires the both lights extinguished image by the processing in step S131 at a period between the turning off of the light 12*a* and the turning on of the light 12*b*.

According to the present embodiment, the number of images (i.e., binarized left difference images and binarized right difference images) acquired during a unit time increases in comparison to the second embodiment, thereby enabling a display of a smooth finger-tip image on the liquid crystal panel 1*a* of the display unit 1 even if the movement of the finger of the vehicle driver D is faster.

Modifications of Above Embodiments

Although the present disclosure has been fully described in connection with preferred embodiment thereof as described above with reference to the accompanying drawings, it is to be noted that various changes and modifications will become apparent to those skilled in the art.

Figure 19:
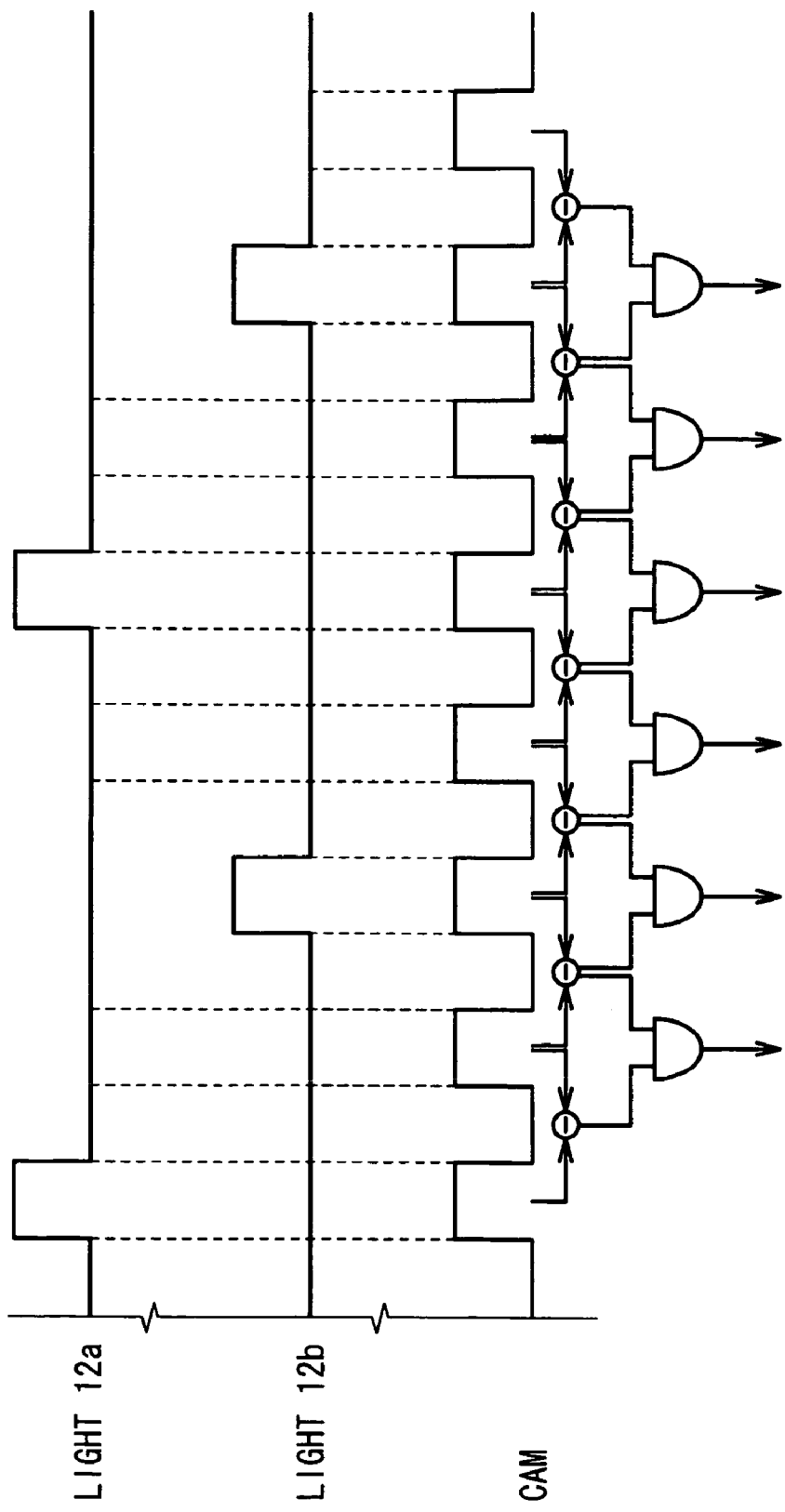
FIG. 19 is a time chart of turning on/off of each light in association with photography timings of a camera in a modification of the third embodiment of the present invention.
Figure 20:
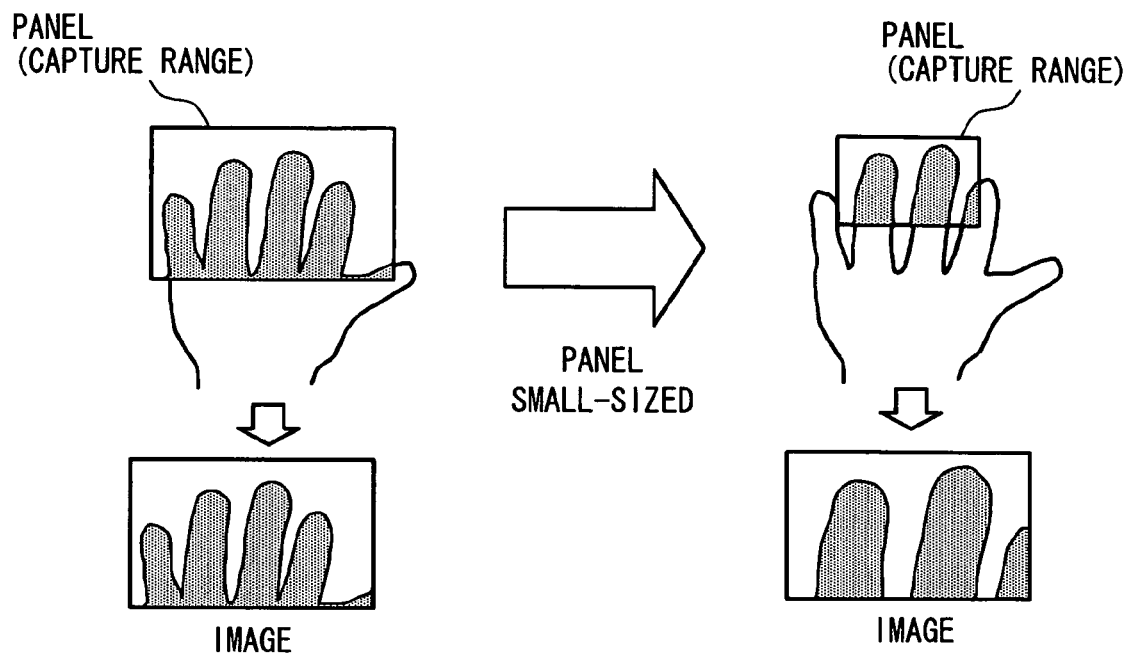
FIG. 20 is an illustration of a problem experienced in a conventional technique.

For example, image capture timings for acquiring the image with each of the lights respectively turned on and the image with both of the lights turned off may have a configuration as illustrated in FIG. 18, or may have a different configuration, that is, for example, a configuration illustrated in FIG. 19. By using the configuration in FIG. 19, smoothness of the finger-tip image displayed on the liquid crystal panel 1*a* of the display unit 1 can be further improved because binarized left and right difference images can be acquired from the two images in two successive steps, that is, one of the image with each of the two lights turned on and the image with both of the two lights turned off in one step, and one of the image with both lights turned off and the image with each of the two lights turned on in a subsequent step.

In addition, though the image to be displayed is generated by comparing the binarized images in the first and the third embodiments, the image to be displayed may be generated by comparing non-binarized images.

Further, though the lights 12a and 12b of the lighting unit 12 are positioned at the lower left and right side of the finger-tip F in the first and the third embodiments, the lights 12a, 12b may be positioned at a lower front and a lower rear side of the finger-tip F in addition to, or, in place of, the configuration in the first and third embodiments.

Fourth Embodiment

The fourth embodiment of the present invention is explained as follows.

Figure 21:
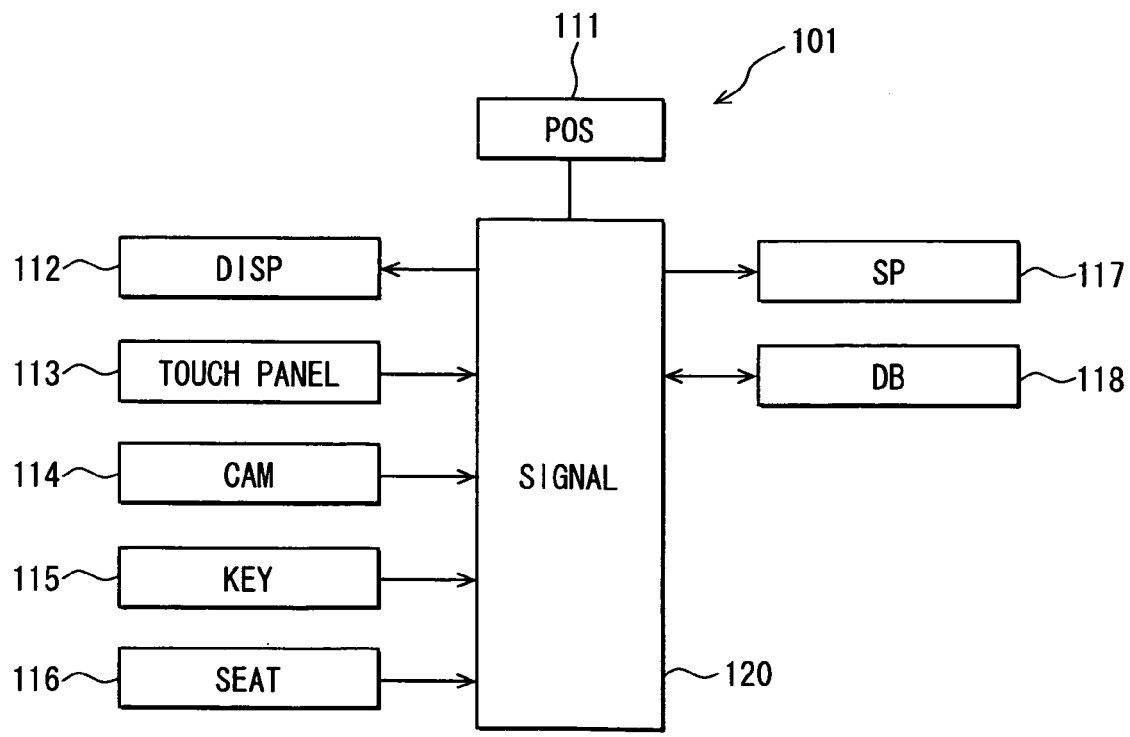
FIG. 21 is a block diagram of a configuration of a navigation apparatus relevant to a fourth embodiment of the present invention.

Configuration of a navigation apparatus 101 for use in a vehicle (i.e., an example of an operating hand projection apparatus) relevant to the present embodiment is shown in FIG. 21. The navigation apparatus 101 has a position sensor 111, a display unit 112, a touch panel 113, a camera 114, a hard key group 115, a seat sensor 116, a speaker 117, a database (DB) 118, and a signal processor 120.

The position sensor 111 having an acceleration sensor, a geomagnetism sensor, a gyro sensor, and a vehicle speed sensor as well as a GPS receiver (all of which are well-known, thereby not being shown in the drawing) outputs information regarding the current vehicle position, the traveling direction, and the speed to the signal processor 120 based on the features of those sensors.

The display unit 112 displays an image based on a video signal output from the signal processor 120 for a user. For example, a display image includes a map around the current position, a menu image (equivalent to an example of an operation reception image), a letter input reception image (equivalent to another example of the operation reception image), and the like. As for the display unit 112, a device such as a liquid crystal display installed in the dashboard of the vehicle, or a head up display reflecting an image onto the windshield of the vehicle may be used.

The touch panel 113 is installed in a position that the driver of the vehicle is easy to reach and operate, with the display unit 112 separated therefrom. The distance from the touch panel 113 to the driver is smaller than the distance from the display unit 112 to the driver. For example, the touch panel 113 may be positioned beside a driver seat.

In addition, the touch panel 113 transmits touched position coordinates to the signal processor 120. In addition, positions of the contact surface (a surface of the panel for detecting a touch of the user) on the touch panel 113 are similarly associated to positions in the display screen of the display unit 112 in an analogous manner. In other words, when the coordinates in the display screen of the display unit 112 are defined as a rectangular range of (0, 0) to (X0, Y0) and the coordinates in the contact surface of the touch panel 113 are defined as a rectangular range of (0, 0) to (x0, y0), the touch (of a user finger) at the coordinates (x, y) on the contact surface of the touch panel 113 indicates that a position (x·X0/x0, y·Y0/y0) in the display screen of the display unit 112 is specified.

Figure 22:
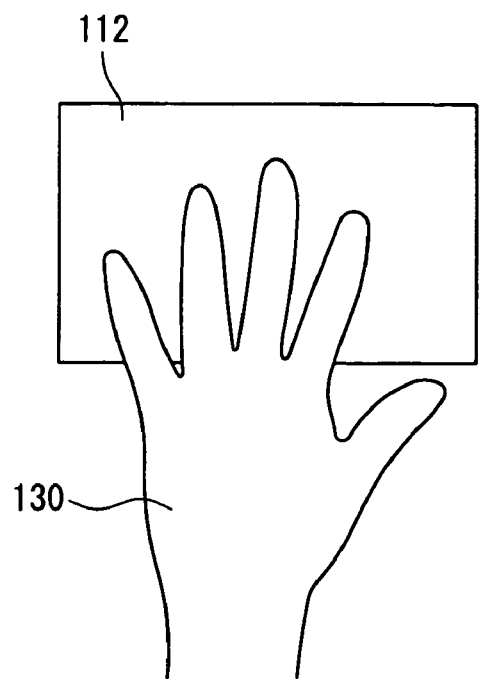
FIG. 22 is an illustration of a hand held on top of a touch panel in the fourth embodiment.
Figure 23:
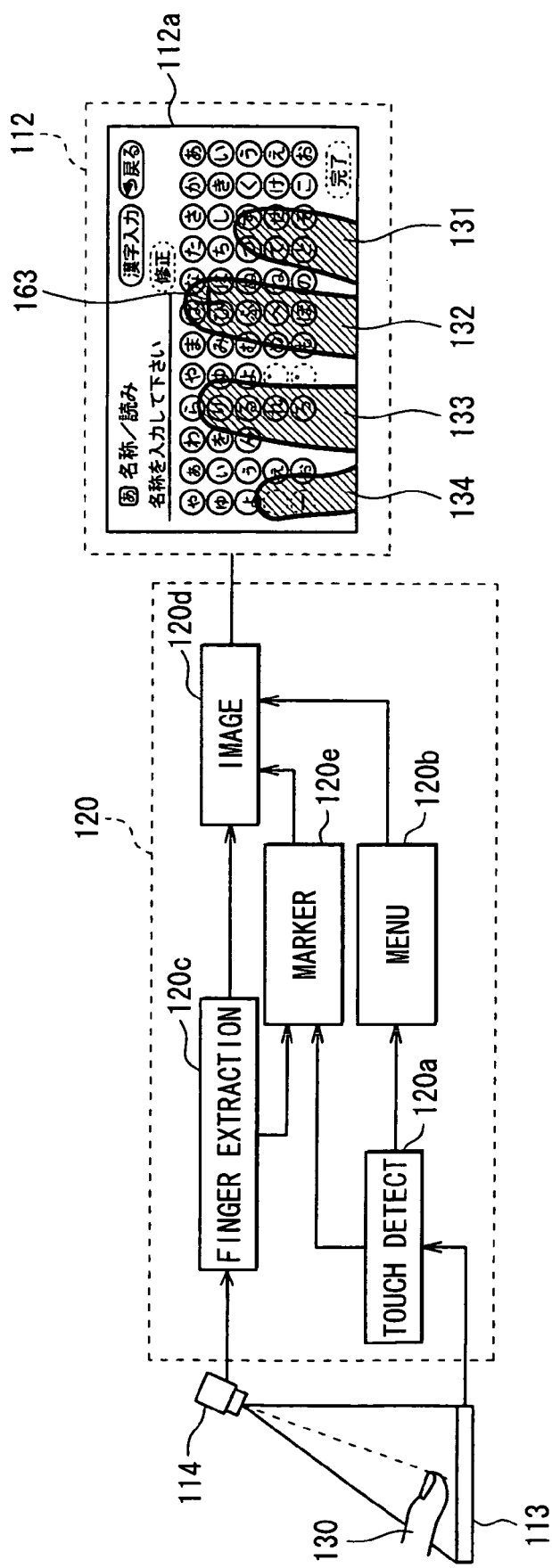
FIG. 23 is a block diagram of functions performed by a signal processor in the fourth embodiment.

The camera 114 is a device to photograph a hand in a manner that covers the contact surface of the touch panel 113. That is, when the hand is positioned perpendicularly above the contact surface of the touch panel 113, the camera 114 captures the hand image such as a hand 130 in FIG. 22. The camera 114 may be, as shown in FIG. 23, positioned further above the contact surface side of the touch panel 113 relative to the hand 130, for capturing an entire contact surface of the touch panel 113 as a photography range. In other words, the camera 114 may be positioned on an opposite side of the touch panel 113, relative to the hand 130.

Alternatively, the camera 114 may be positioned below the hand 130 on the contact surface side of the touch panel 113, that is, the hand 130 looks down on the camera 114 on the contact surface side of the touch panel 113. The image photographed by the camera 114 is output to the signal processor 120.

The hard key group 115 has multiple hard keys disposed around the contact surface of the touch panel 113 which can be mechanically pushed down, and an output signal corresponding to the pressed-down key is output to the signal processor 120.

The seat sensor 116 is installed in each of the seats in the vehicle, and the sensor 116 outputs a detection signal to the signal processor 120 when it detects seating of an occupant in each of the seats.

The DB 118 is composed of a nonvolatile storage medium such as a hard disk drive (HDD) and a device for reading and writing data from/to the HDD. The storage medium concerned memorizes map data for route guidance as well as programs that are executed by the signal processor 120.

The map data have road data and facility data. The road data includes the positional information and classification information of links, the positional information and classification information of nodes, information of a node-and-link relationship and the like. The facility data have multiple records for each of the facilities, and each of the multiple records has data showing facility name information, location information, land lot number information, facility classification information and the like regarding the subject facility.

The signal processor (equivalent to a computer) 120 is a microcomputer having a CPU, RAM, ROM, I/O and the like. The CPU executes a program for operating the navigation apparatus 101 by reading the program from the ROM or the DB 118, and, in the course of execution of the program, the CUP reads information from the RAM, ROM and the DB 118, write information to storage medium of the RAM and the DB 118, and exchanges signals with the position sensor 111, the display unit 112, the touch panel 113, the camera 114, the hard key group 115, the seat sensor 116, and the speaker 117.

As for practical processing to be perform by the signal processor 120 when it executes the program, current position identification processing, map display processing, destination input reception processing, navigation route calculation processing, route guidance processing can be listed among other processing.

The current position identification processing is to specify a current position and the traveling direction of the vehicle by using well-known map matching technology and the like based on a signal from the position sensor 111. The map display processing is to control the display unit 112 to display a map of a specific area such as the vicinity of the current position of the vehicle or the like. The information used for map display is acquired from the map data in the course of the map display processing.

The destination input reception processing is to decide a destination according to an operation of the user on the touch panel 113.

The navigation route calculation processing is to calculate the most suitable navigation course to the destination accepted by destination input reception processing.

The route guidance processing is to provide driving guidance along the navigation route by outputting, prior to passing locations such as guidance points around intersection on the navigation route, voice guidance indicating a right/left turn from the speaker 117 together with an enlarged picture of the guidance points on the display unit 112.

In addition, the signal processor 120 prompts user operation in each of the above processings by displaying the operation reception image on the display unit 112. For example, a map image is displayed during the map display processing as the operation reception image. In the map image, operation/function buttons such as a scale change button for changing map scale, a re-route button for re-routing and/or re-defining the destination and the like.

When the user specifies a certain area (i.e., an effective area) displayed as a button by using the touch panel 113, the signal processor 120 changes screen display contents (more concretely, contents of the operation reception image) to carry out a desired function (for example, a map scale change, a destination input reception process or the like) corresponding to the specified area. For example, when the scale change is specified, the map scale is changed. Or, when the destination input reception processing is started, a menu image for allowing the user to select a destination input method as the operation reception image.

The processing executed by the signal processor 120 at the time of displaying the operation reception image is functionally divided into following items. That is, as shown in FIG. 23, a touch detection process 120*a*, an operation menu process 120*b*, a finger extraction process 120*c*, an image generation process 120*d*, and a finger mark process 120*e*. (Japanese characters in FIG. 23 are shown only for illustration purpose. That is, Japanese characters used in the drawing indicate instructions and/or button areas in the menu screen.)

The touch detection process 120*a* provides an input coordinates signal of the display unit 112 for the operation menu process 120*b* and the finger mark process 120*e* after acquiring a touched position by the hand 130 of the user on the touch panel 113 as a touch signal, more practically as the coordinates of the contact surface of the touch panel 113 and converting the contact surface coordinates to the screen position coordinates of the display unit 112 that is to be provided as the input coordinates signal.

The operation menu process 120*b* generates a current operation reception image, and provides the image for the image generation process 120*d*. In addition, the operation menu process 120*b* identifies a user input position in the operation reception image based on the input coordinates signal, and changes the current operation reception image to another image (e.g., another operation reception image, or other non-operation reception image) to be provided for the image generation process 120*d* for executing a function associated with the effective area if the identified position is in an effective area, or maintains the contents of the display image to be provided for the image generation process 120*d* as they currently are if the identified position is not in the effective area (i.e., an area that is not programmed to be set/used as a button area).

The finger extraction process 120*c* acquires the image which has been photographed by the camera 114, and extracts an area of the hand 130 from the acquired image, and identifies, as a finger area, an area of the display unit 112 corresponding to the extracted area, and provides the identified area for the finger mark process 120*e*. The finger area is extracted from the photographed image by using a method disclosed, for example, in Japanese patent documents such as JP-A-H10-269012, JP-A-2000-6687 or the like.

The image generation process 120*d* generates finger images 131 to 134 that represent the finger area from the finger extraction process 120*c*, and superposes the finger images 131 to 134 onto the display images 112*a* that is received from the operation menu process 120*b* for the display on the display unit 112. In this case, the superposed finger images 131 to 134 are generated as transparent images for allowing the display images 112*a* to be perceived on the display unit 120 even when the finger images 131 to 134 are displayed on top of the images 112*a* that are received from the operation menu process 120*b*.

In addition, the image generation process 120*d* displays a finger marker 163 as a cross shape marker at a position of the display unit 120 correspondingly to a finger marker position in case the marker position is provided from the finger mark process 120*e*.

The finger mark process 120*e* identifies fingertip portions of the finger images 131 to 134 received from the finger extraction process 120*c* based on the images 131 to 134, and outputs a position of at least one of the identified fingertip portions to the image generation process 120*d* as the fingertip marker position information.

Figure 24:
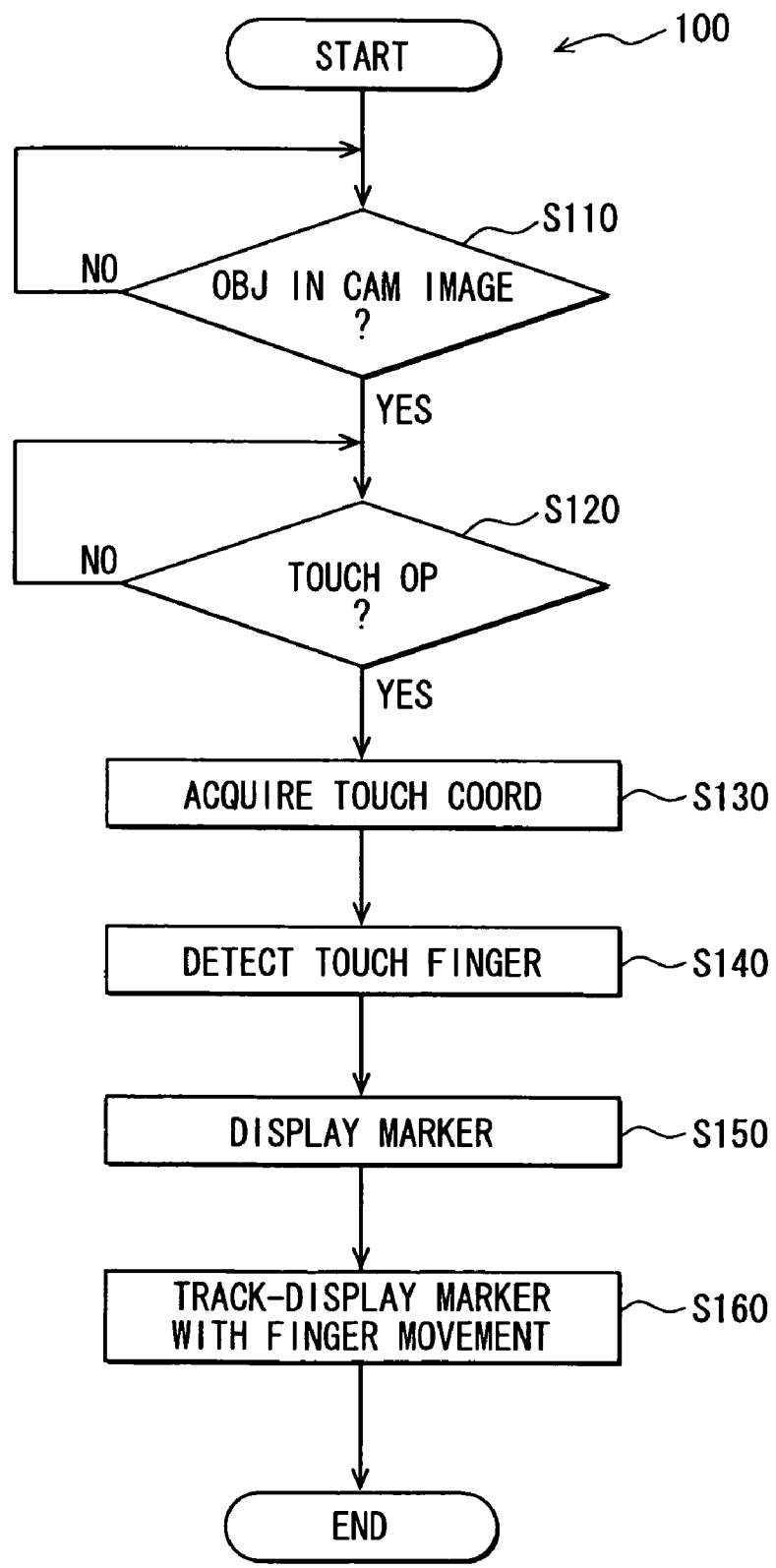
FIG. 24 is a flow chart of a finger mark process in the signal processor in the fourth embodiment.

The details of the finger mark process 20*e* are explained in the following. The signal processor 120 carries out a program 100 as shown in FIG. 24 to realize a function of the finger mark process 120*e*.

The signal processor 120 waits for, in the course of execution of the program 100, an object (e.g., a hand of the user) entering in a camera image photographed by the camera 114 in step S110, and then carries out step S120 immediately after entrance of the hand into the image. The entrance of the object into the image is determined based on the fact whether the finger extraction process 120*c* has extracted the finger image or not.

In step 120, the process of the program 100 waits for the touch operation on the touch panel 113 (i.e., an operation for touching the contact surface of the touch panel 113), and then executes step S130 immediately after detecting a touch. Whether the touch operation is performed or not is determined based on the input signal from touch detection process 120*a*.

In step S130, based on the input coordinates signal from the touch detector 120*a*, a specified position by a touch on the display screen is identified.

In step S140, based on the identified position as described above, a finger used for the touch is identified. More practically, based on the finger image acquired from the finger extraction process 120*c*, a fingertip position of each finger is identified. Then, a position that is closest to the identified position from among the finger positions is exclusively identified as a fingertip of a finger that is considered as a marking object.

A method to identify a fingertip position based on a finger image is explained in the following. At first, the finger image is moved in a user direction that can be defined, for example, as a movement of the user's hand when the user pulls back the hand from above the touch panel 113 toward a body of the user. The user direction may be defined, for example, as a downward of the screen of the display unit 112 in FIG. 22.

Then, the difference between the finger images before and after the movement is taken. In other words, a non-overlapping part between the before-movement image and the after-movement image is identified. The difference is usually identified as an arc part at the edge of the fingertip.

Then, in each of the arc parts, a gravity center of the arc part is identified as a fingertip position. Alternatively, a position that has a certain offset from the gravity center toward the user side may be identified as the fingertip position.

In step S150, the position coordinates of the fingertip of the marking object finger is output to the image generation process 120 as positional information of a fingertip marker. According to the positional information, the image generation process 120d controls the display unit 112 to display the finger marker 163 in a superposing manner.

Then, in step S160, when the user moves his/her finger on the touch panel 113, the display position of the finger marker 163 is moved in a tracking manner. More practically, every time the camera 114 photographs the fingertip (e.g., 30 times in one second), the fingertip in the photographed image is identified in a manner described in above-mentioned step S140, and the position of the marking object fingertip that is nearest to the one in the previous image from among fingertip positions is provided for the image generation process 120d as the positional information of the fingertip marker. Then, the image generation process 120d controls the display unit 112 to move the finger marker 163 in a tracking manner for tracking the movement of the marking object finger.

In other words, the processing of step S160 is carried out until the finger images 131 to 134 go out of the photography range of the camera 114, or until the finger extraction process 120c does not detect the finger area. Then, the signal processor 120 stops the output of the positional information of the fingertip marker to the image generation process 120d when the finger images 131 to 134 go out of the photography range of the camera 114. That is, the display unit 112 finishes display of the finger marker 163.

As described above, the signal processor 120 selects, as the marking object finger, one of the multiple finger images 131 to 134 in the hand images photographed by the camera 114 (see step S140), and displays the finger marker 163 exclusively at the fingertip portion of the selected marking object finger 132 from among the multiple finger images 131 to 134 in the hand image that is to be displayed in a superposing manner on the display unit 112 (see steps 150, 160).

Therefore, the user can easily recognize which portion of the finger will touch the touch panel 113 in advance by viewing the superposed hand image having the marker 163 displayed at the fingertip portion. Further, only one finger is selected as the marking object finger that is marked by the marker 163, thereby enabling the user to easily determine which finger he/she should be using from among the multiple fingers displayed on the display unit 112.

In addition, the signal processor 120 selects, as the marking object finger, a finger which touches the touch panel 113 first (see step S120) after the hand enters the photography range of the camera 114 in the contact surface of the touch panel 113 (see step S110).

This is based on an assumption that it is very likely that the finger which is firstly used by the user for using the touch panel 113 is the finger that is most usable for the user. Therefore, after having the hand entered the photography range of the camera 114, the user operation on the touch panel 113 can be preferably accepted by identifying the finger that firstly touches the touch panel 113 as the marking object finger.

Figure 25:
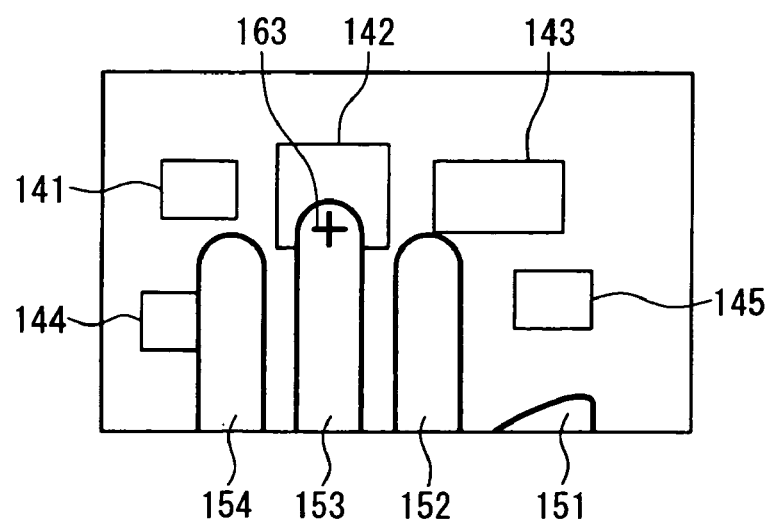
FIG. 25 is an illustration of effective areas in an operation reception image in the fourth embodiment.

Further, the signal processor 120 may determine, as shown in FIG. 25, which of buttons 141 to 145 in the operation reception image is touched, or none of them touched in step S120. In this case, the signal processor 120 selects, as the marking object finger, a finger that firstly touches a position corresponding to the effective areas (i.e., buttons) 141 to 145 after a hand with fingers 151 to 154 enters the photography range of the camera 114 in the contact surface of the touch panel 113.

The user may touch, by mistakes, the position corresponding to the non-effective areas with the fingers 151 to 154 when he/she does not have an intention to touch the position on the touch panel 113. According to the configuration described above in the present embodiment, the finger 153 that firstly touches the position corresponding to the effective area is identified as the marking object finger, the possibility for erroneously identifying a mis-touched finger as the marking object finger is decreased when the user does not have an intention to use the mis-touched finger as an operation finger.

Fifth Embodiment

Figure 26:
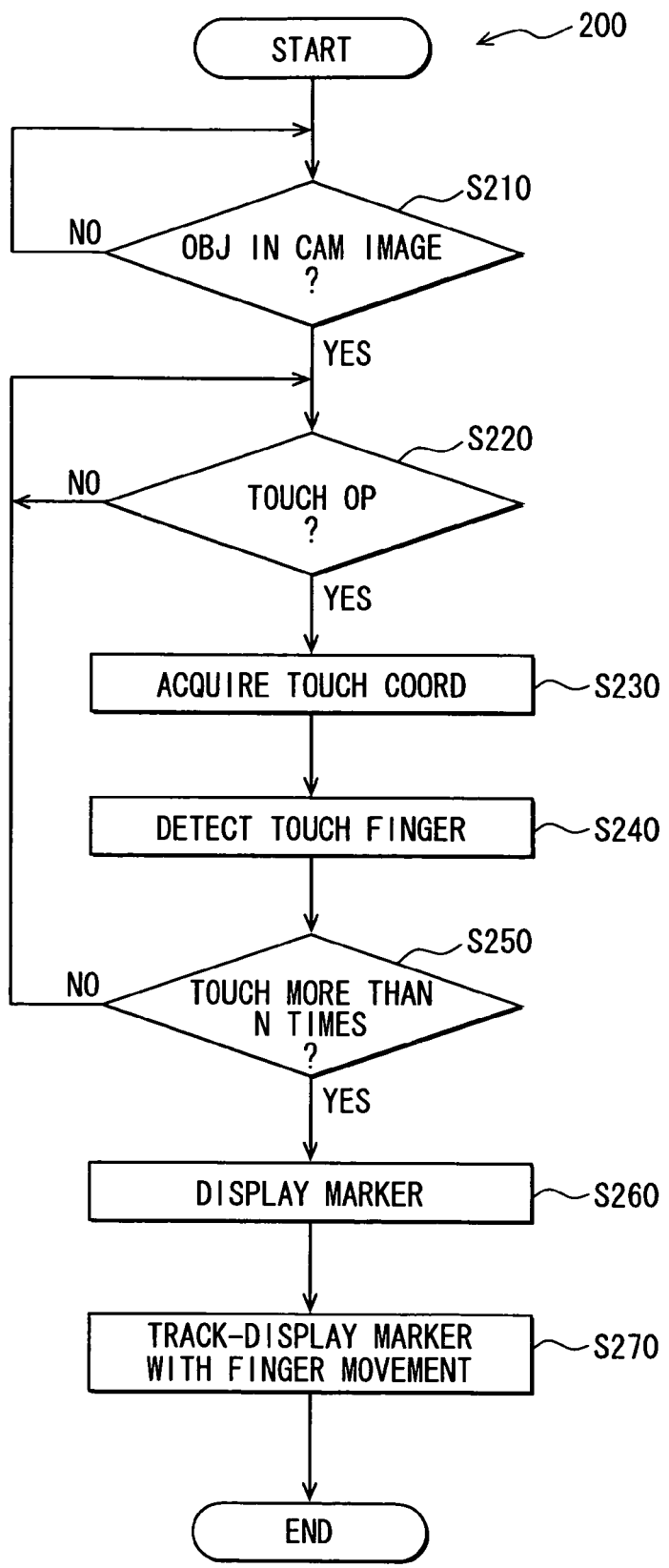
FIG. 26 is a flow chart of another finger mark process performed by the signal processor in a fifth embodiment of the present invention.

The fifth embodiment of the present invention is explained in the following. Differences between the present embodiment and the fourth embodiment are processes in a program 200 shown in FIG. 26 that is executed by the signal processor 120 for the function of the finger mark process 120e, in place of the program 100 in FIG. 24. In this case, descriptions of steps S210, S220, S230, S240, S260, and S270 are omitted because processing in those steps is same as the one in steps S110, S120, S130, S140, S150, and S160.

The following description is focused on the differences of the present invention from the fourth embodiment. The signal processor 120 determines whether there have been effective touches for more than a predetermined number N (N: equal to or greater than 2) with the same finger in step S250 that follows step S240. More practically, subsequently to the affirmative determination in S210, the number of touches by the touching finger identified in S240 is counted for every touching finger. Then, whether the number of touches by the touching finger identified in S240 equals/exceeds the reference number N or not is determined. If the number is equal to or exceeds N, step S260 is subsequently executed. If the number is smaller than N, the process returns to S220.

In this manner, the signal processor 120 selects a finger that has touched for the number of N times or more firstly after entrance into the photography range of the camera 114 in the touch panel 113 as the marking object finger.

In addition, in S250, the number of successive touch times by the identified finger may be counted for every touching finger after the affirmative determination in S210. In this case, if a touch by one finger is followed by a touch by another finger, the number of touch counts is reset to zero.

In this manner, the signal processor 120 selects a finger that has successively touched for the number of N times or more firstly after entrance into the photography range of the camera 114 in the touch panel 113 as the marking object finger.

Because the finger identified as touching the touch panel 113 for more than predetermined times (successively or discretely) is highly possibly a finger that is intentionally used by the user, selecting that finger as the marking object finger may effectively decrease the possibility of erroneous selecting the finger that has touched the touch panel 113 by mistake as the marking object finger.

Sixth Embodiment

Figure 27:
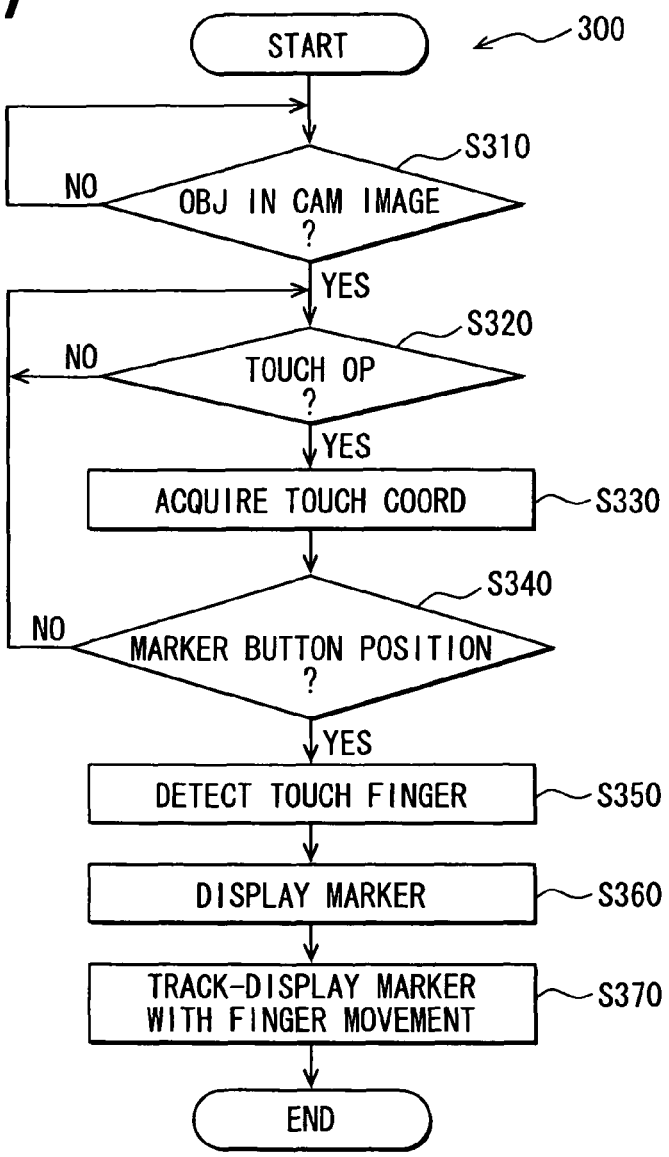
FIG. 27 is a flow chart of yet another finger mark process performed by the signal processor in a sixth embodiment of the present invention.
Figure 28:
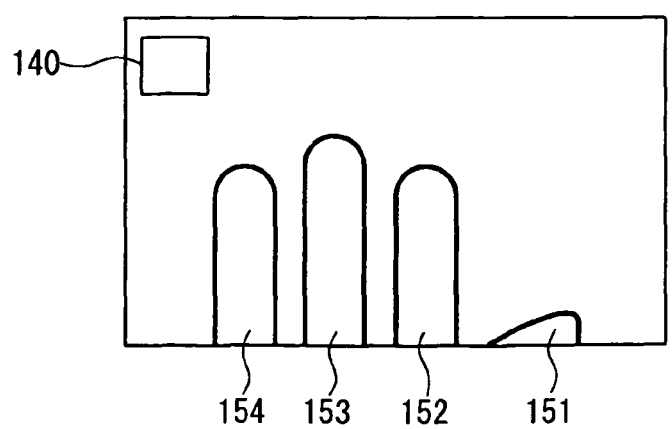
FIG. 28 is an illustration of a marker button in the operation reception image in the sixth embodiment.

The sixth embodiment of the present invention is explained in the following. Differences between the present embodiment and the fourth embodiment are processes in a program 300 shown in FIG. 27 that is executed by the signal processor 120 for the function of the finger mark process 120e, in place of the program 100 in FIG. 24, and a marker button 140, in addition to the effective area, in the operation reception image that is to be output from the finger mark process 120e to the image generation process 120d as shown in FIG. 28.

In this case, descriptions of steps S310, S320, S330, S350, S360, and S370 are omitted because processing in those steps is same as the one in steps S110, S120, S130, S140, S150, and S160.

The following description is focused on the differences of the present invention from the fourth embodiment. The signal processor 120 determines whether an identified position of the touch by the finger is within a range of the marker button 140 or not in S340 that follows S330. If the identified position is within the range of the marker button 140, S260 is subsequently executed. If the identified position is not within the range of the marker button 140, the process returns to S320.

In this manner, the signal processor 120 selects, as the marking object finger, a finger that has touched the position in the touch panel 113 corresponding to the range of the marker button 140 that is dedicated for identifying the marking object finger in the operation reception image (see S340).

As described above, the marker button 140 is used for identifying, as the marking object finger, a finger that pointed the area of the marker button 140. As a result, the user's intention of using that finger as the marking object finger is clearly confirmed. Therefore, selecting that finger as the marking object finger may effectively decrease the possibility of erroneous selecting the finger that has touched the touch panel 113 by mistake as the marking object finger.

Furthermore, according to the above configuration, the user can avoid performing an additional operation for changing the operation reception image to the one that allows an input for identifying the marking object finger. That is, in other words, the user can simply touch the touch panel 113 to select the marking object finger without going to the bother of performing any other operation.

Seventh Embodiment

Figure 29:
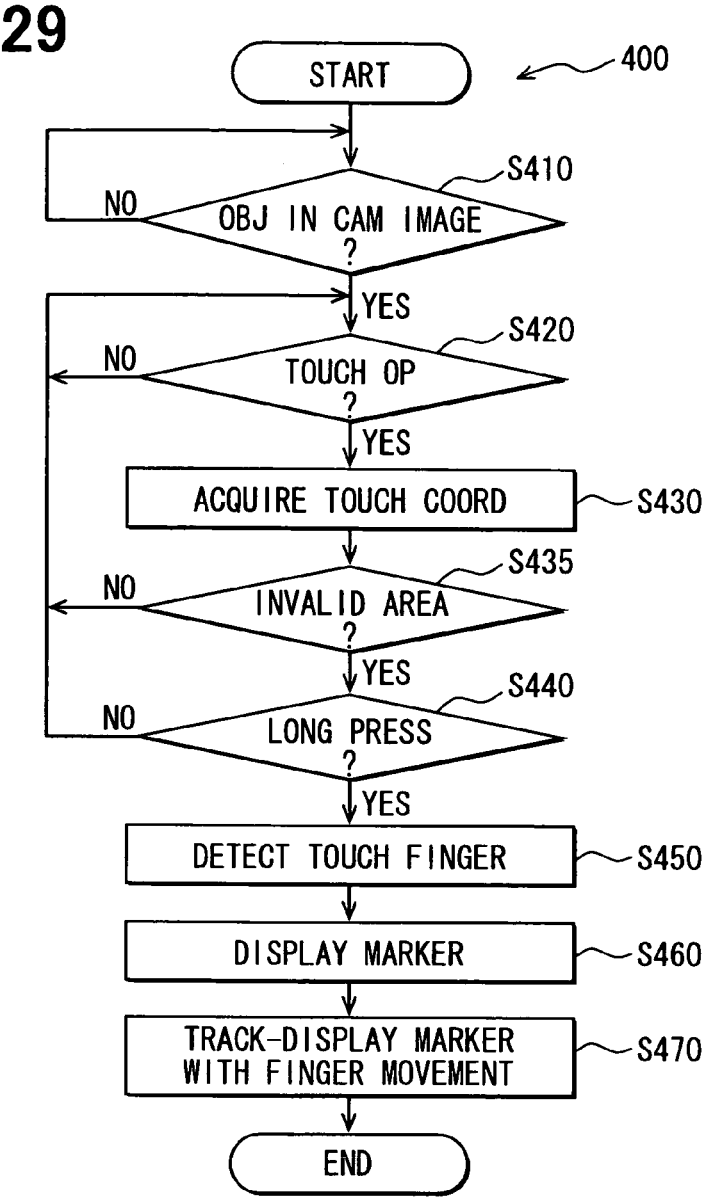
FIG. 29 is a flow chart of still yet another finger mark process performed by the signal processor in a seventh embodiment of the present invention.

The seventh embodiment of the present invention is explained in the following. Differences between the present embodiment and the fourth embodiment are processes in a program 400 shown in FIG. 29 that is executed by the signal processor 120 for the function of the finger mark process 120e, in place of the program 100 in FIG. 24. In addition, descriptions of steps S410, S420, S430, S450, S460, and S470 are omitted because processing in those steps is same as the one in steps S110, S120, S130, S140, S150, and S160.

Figure 30:
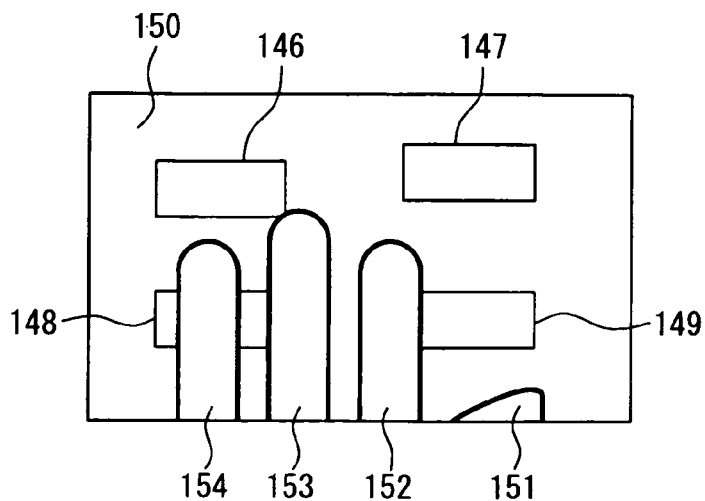
FIG. 30 is an illustration of a non-effective area in the operation reception screen in the seventh embodiment.

The signal processor 120 determines whether an identified position of the touch is within a non-effective area or not in S435 that follows S430. If the identified position is within the non-effective area, S440 is subsequently executed. If the identified position is not within the non-effective area, the process returns to S420. As described in the fourth embodiment, the non-effective area indicates an area 150 that exists outside of the effective buttons 141 to 145 as shown in FIG. 30.

Further, in S440, the process clocks an elapsed touching time at the position identified in S430 to determine whether the touching time exceeds a first reference time (e.g., 3 seconds). If the touching time is shorter than the first reference time, the process returns to S420. If the touching time is equal to or greater than the first reference time, the process subsequently executes S450.

As described above, the signal processor 120 selects, as the marking object finger, a touching finger that keeps touching a position corresponding to the non-effective area (see S435) for the time that is equal to or greater than the first reference time (see S440). That is, the finger used for a "long-press (a touch being continued for a certain duration of time)" in the non-effective area is selected as the making object finger.

It is very likely that an operation to keep pressing/touching the non-effective area for more than a certain period of time, instead of touching the area for a very short time, indicates/reflects a user's intention for achieving a certain objective. Therefore, the process described above can effectively decrease the possibility of erroneously determining the finger that touches the touch panel 113 by mistake as the marking object finger.

Furthermore, according to the above configuration, the user can avoid performing an additional operation for changing the operation reception image to the one that allows an input for identifying the marking object finger. That is, in other words, the user can simply touch the touch panel 113 to select the marking object finger without going to the bother of performing any other operation.

Eighth Embodiment

Figure 31:
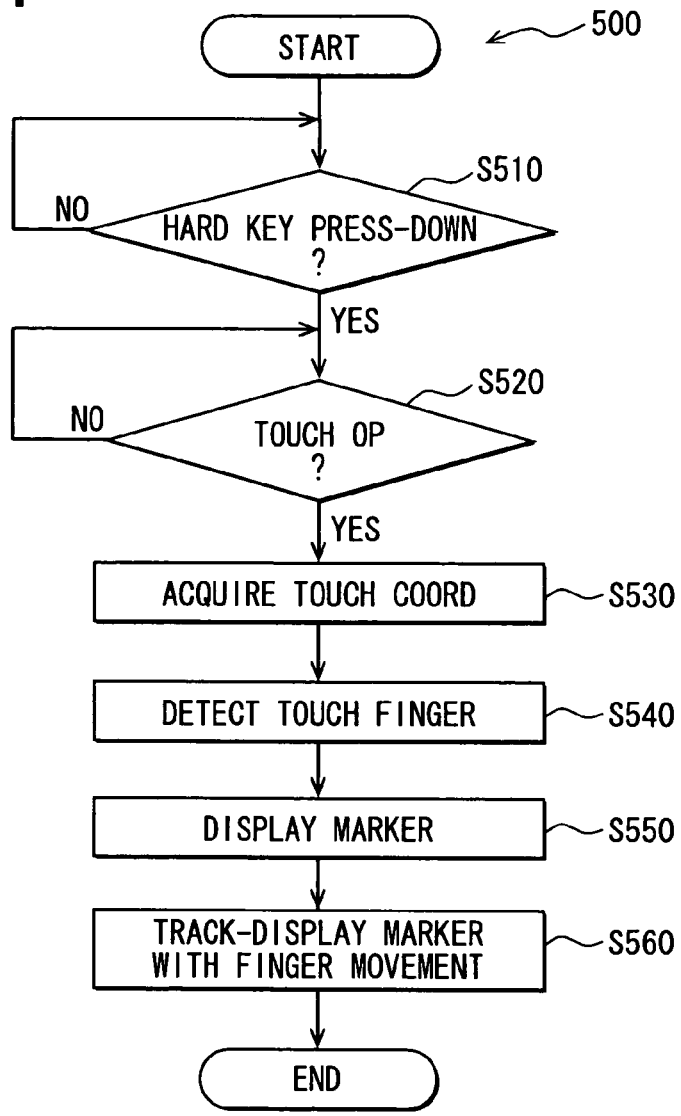
FIG. 31 is a flow chart of still yet another finger mark process performed by the signal processor in an eighth embodiment of the present invention.
Figure 32:
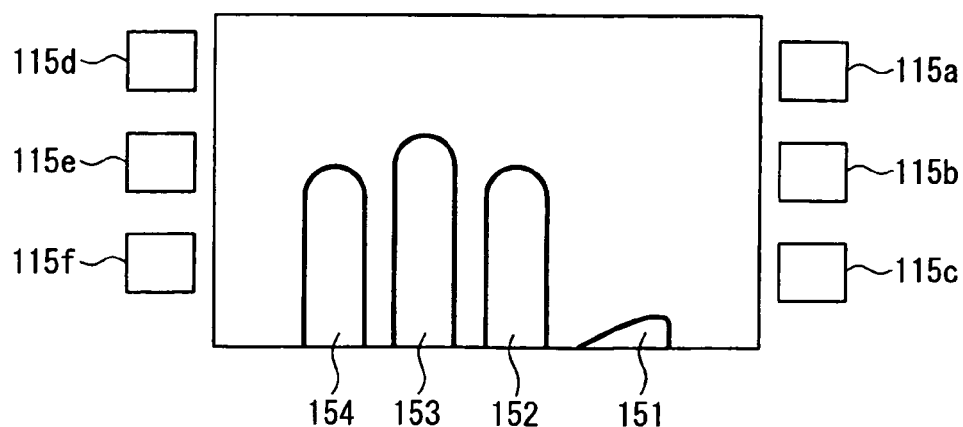
FIG. 32 is an illustration of an arrangement of hard keys around a touch panel in the eighth embodiment.

The eighth embodiment of the present invention is explained in the following. Differences between the present embodiment and the fourth embodiment are processes in a program 500 shown in FIG. 31 that is executed by the signal processor 120 for the function of the finger mark process 120e, in place of the program 100 in FIG. 24. In addition, descriptions of steps S520, S530, S540, S550, and S560 are omitted because processing in those steps is same as the one in steps S120, S130, S140, S150, and S160.

In the course of execution of the program 500, the signal processor 120 waits for a press-down of one of the hard keys in the hard key group 115 in S510, and, upon having the press-down, executes the subsequent steps of S520 and the like. In this case, the hard keys 115a to 115f in the hard key group 115 are disposed around the contact surface of the touch panel 113 as multiple pieces of keys. Therefore, the user can easily touch one of the hard keys in the hard key group 115.

The signal processor 120 selects, as the marking object finger, a finger that touches the touch panel 113 firstly after the press-down of one of the hard keys 115a to 115f.

It is highly likely that the finger firstly used after the press-down of one of the hard keys 115a to 115f reflects the user's intention for achieving a certain purpose. Therefore, the process described above can effectively decrease the possibility of erroneously determining the finger that touches the touch panel 113 by mistake as the marking object finger.

Ninth Embodiment

Figure 33:
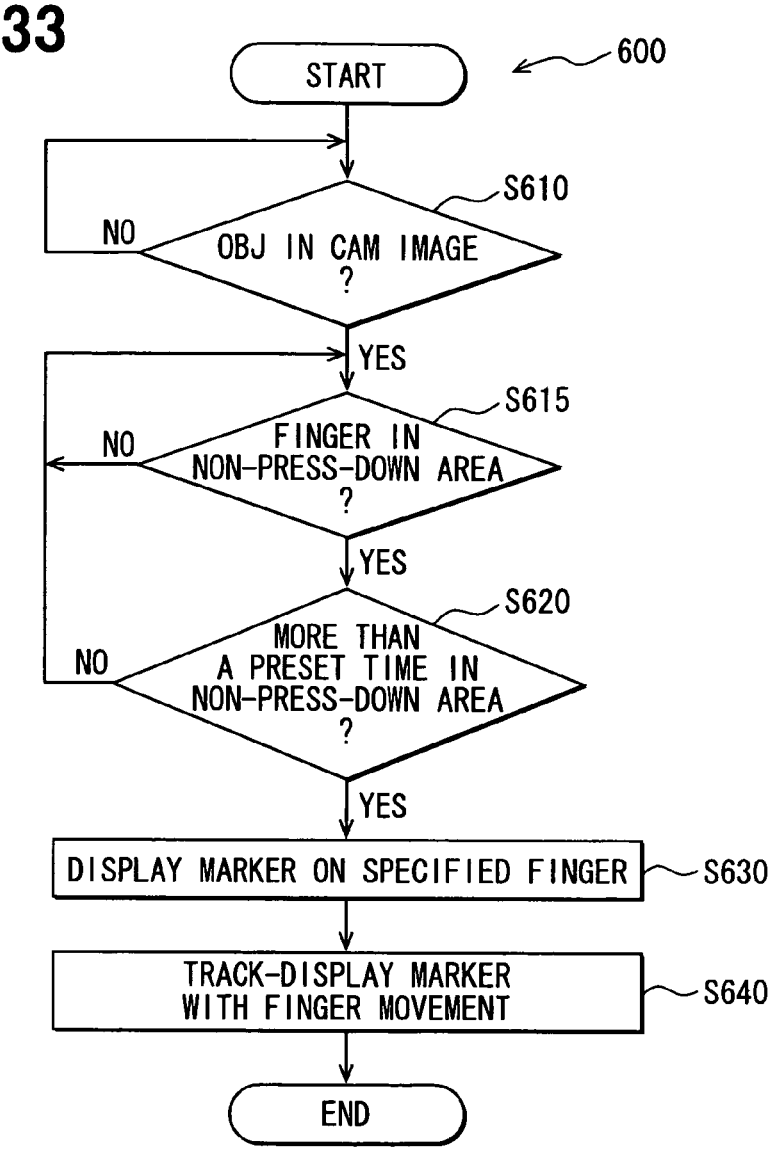
FIG. 33 is a flow chart of still yet another finger mark process performed by the signal processor in a ninth embodiment of the present invention.

The ninth embodiment of the present invention is explained in the following. Differences between the present embodiment and the fourth embodiment are processes in a program 600 shown in FIG. 33 that is executed by the signal processor 120 for the function of the finger mark process 120e, in place of the program 100 in FIG. 24. In addition, descriptions of steps S610, and S640 are omitted because processing in those steps is same as the one in steps S110, and S160.

Figure 34:
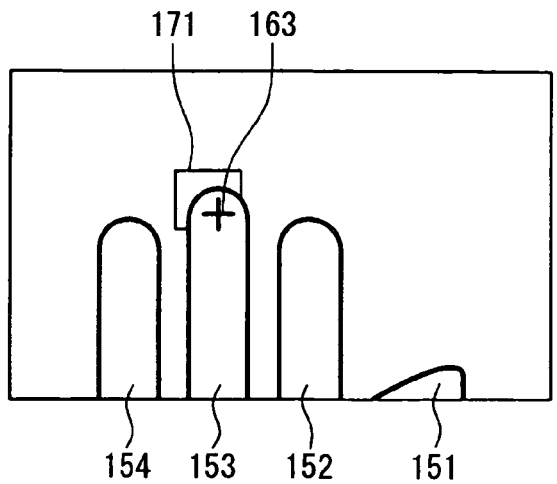
FIG. 34 is an illustration of a non-press-down acquisition area in the ninth embodiment.

In S615 that follows S610, the signal processor 120 identifies fingertip positions in the hand image by a method used in S140 of FIG. 24, and waits until one of the fingertip positions enters a non-press-down acquisition area. When one of the fingertip positions enters the non-press-down acquisition area, S620 is executed subsequently. FIG. 34 shows an example of the non-press-down acquisition area 171 in the operation reception image.

In S620, the processor 120 counts the elapsed time starting from the entrance of the finger into the non-press-down acquisition area 171. The elapsed time is counted until the exit of the finger from the non-press-down acquisition area 171 or until a second reference time of 5 seconds, for example.

If the finger exits from the non-press-down acquisition area 171 before the second reference time, S615 is repeated. If the finger stays in the non-press-down acquisition area 171 for more than the second reference time, S630 is executed subsequently.

In addition, whether the user has touched a position corresponding to the non-press-down acquisition area 171 may or may not affect the determination result in both of S615 and S620. That is, the touch of a position corresponding to the non-press-down acquisition area 171 may result in a negative determination in S615 and S620.

In S630, the position of the fingertip in the non-press-down acquisition area 171 from among the identified fingertip positions is provided for the image generation process 120d as positional information of the finger marker, and then S640 is executed subsequently.

As described above, the signal processor 120 selects, as the marking object finger, a finger that is held above a certain area of the touch panel 113 (i.e., a position corresponding to the non-press-down acquisition area in the screen image of the display unit 112) for more than the second reference time.

According to the above configuration, the user can specify the marking object finger without performing an operation of touching the touch panel 113. That is, the user can avoid going to the bother of switching the operation reception images.

Tenth Embodiment

The tenth embodiment of the present invention is explained in the following. Differences between the present embodiment and the fourth embodiment are processes in a program 700 shown in FIG. 35 that is executed by the signal processor 120 for the function of the finger mark process 120e, in place of the program 100 in FIG. 24. In addition, descriptions of steps S710, S720, S730, S740, S750, and S760 are omitted because processing in those steps is same as the one in steps S120, S130, S140, S150, and S160.

The signal processor 120 records characteristic information regarding the shape of a finger image received from the finger extraction process 120c in the DB 118 in step S755 that follows S750. The characteristic information includes, for example, ratios of finger widths, ratios of finger lengths, and finger outline shapes in association with the arrangement of each of the finger positions. That is, for example, for each of the right most finger 151, the second right finger 152, the third right finger 153, and the fourth right finger 154, the ratio of the finger width and the ratio of the finger length relative to the finger width/length of the finger 154 that serves as the reference finger are recorded.

In addition, the fingers in the photographed image may be identified as separate finger when finger images are respectively separate in the photographed image, that is, when the palm of the hand is not captured in the image.

In addition, the signal processor 120 repeats the tracking process for displaying the finger marker in S760 until the finger image exits from the photography range in S765. After the exit of the finger from the photography range, the process stops the provision of the finger marker position information for the image generation process 120d. In this manner, display of the finger marker on the display unit 112 is stopped.

Then, the signal processor 120 waits for the hand having multiple fingers to enter the photography range in S755, as in S710. Then, the processor 120 compares the characteristic information of the hand image that has newly entered the range with the characteristic information recorded in S755 for determining that the two hands are identical. If they are determined as identical, S785 is subsequently executed. If they are not determined as identical, the currently recorded characteristic information is erased in S780 to repeat S720.

In this case, the two hands are determined to be identical when, for example, the sum total of the absolute values of the errors of the ratio of the dimension of each finger against the reference finger is equal to or smaller than a predetermined value.

Because the distance from the camera 114 to the hand may change according to the position of the hand, that is, according to the manner how the user holds the hand, the finger size ratios serve as a more appropriate indicator for determining the identity of the two hands, in comparison to the absolute size (i.e., lengths and widths) of the fingers.

In S785, a marking object finger is selected from among the multiple fingers which have newly entered the photography range. More practically, the new marking object finger is selected so that the new marking object finger relative to the multiple fingers of the newly photographed hand has the same arrangement as the previous marking object finger relative to the multiple fingers of the previous photographed hand. Then, in S790, the fingertip positions selected in S785 is provided for the image generation process 120d as the finger marker positional information.

As described above, the signal processor 120 records the characteristic information regarding the hand shape and the positional relationship of the marking object finger relative to the multiple fingers of the hand that are captured by the camera 114 (see S755).

Further, the signal processor 120 once erases the finger markers (see S770) after the exit of the fingers from the photography range in the touch panel 113 (see step 765). Then, the signal processor 120 selects a new marking object finger according to the positional relationship of the recorded marking object finger (see S785 and S790) if the multiple fingers enter the photography range of the camera 114 in the touch panel 113 (see S775) on a condition that the resemblance between the characteristic information regarding the recorded hand shape and the characteristic information regarding the new hand shape currently captured by the camera 114 is observed (step 780).

According to the above configuration, the same finger is selected again as the marking object finger even when the marking object finger enters the photography range after exiting from the range. Therefore, the user can avoid the bother of setting the same finger as the marking object finger.

Eleventh Embodiment

The eleventh embodiment of the present invention is explained in the following. In the present embodiment, the signal processor 120 selects only one of the multiple fingers in the images as the marking object finger, or selects all of the multiple fingers in the image.

Figure 36:
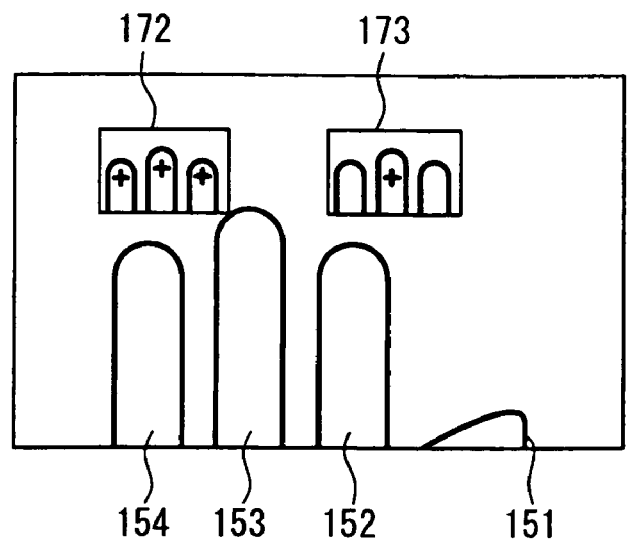
FIG. 36 is an illustration of the operation reception image including a multiple finger button and a single finger button in an eleventh embodiment.

For achieving the above purpose, the operation menu process 20b includes, in the operation reception image, a multiple finger button 172 and a single finger button 173 as shown in FIG. 36. In addition, these buttons 172, 173 may be a part of the effective area, or may be a part of the non-effective area.

When the operation menu process 120b provides such an operation reception image for the image generation process 120d, the finger mark process 120e enters a multiple-finger mode upon having a signal that indicates a touch in the multiple finger buttons 172 from the touch detection process 120a.

Figure 37:
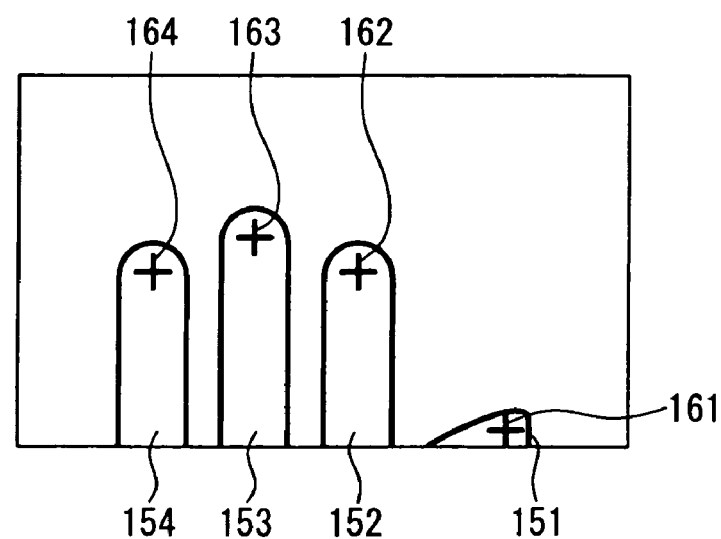
FIG. 37 is an illustration of finger markers attached to all of the fingers in a finger image in the eleventh embodiment.

In the multiple-finger mode, information of multiple fingertip positions (e.g., all fingertip positions) from among the finger images 151 to 154 is provided for the image generation process 120d as the positional information of the finger marker. In this manner, the finger markers 161 to 164 are displayed at all of the fingertips on the display unit 112 as shown in FIG. 37.

In addition, the finger mark process 120e enters a single finger mode upon having a signal that indicates a touch in the single finger button 173 from the touch detection process 120a. In the single finger mode, one of the multiple fingers is selected from among the finger images 151 to 154 by the methods disclosed in the second to tenth embodiments, and information of the selected fingertip position is provided for the image generation process 120d as the positional information of the finger marker. In this manner, the finger marker is displayed only at the fingertip of the selected finger on the display unit 112.

As described above, the signal processor 120 can switch the multiple-finger mode and the single finger mode, according to the user instruction. The user may prefer the display of multiple finger markers to the display of a single finger marker. That is, various user preferences can be accommodated in a flexible manner.

In addition, the signal processor 120 may switch the multiple/single finger mode in the following manner. That is, if the non-marked finger touches the touch panel 113 successively for a predetermined number of times (i.e., the number is equal to or above 2) in the single finger mode, the signal processor 120 queries the user by displaying a dialog (i.e., an operation reception image) on the display unit 112 and allowing the user to selection from two options. That is, one option is to switch the marked finger to the finger that is currently touching the touch panel 113 for the multiple times with the single finger mode maintained. The other option is to switch to the multiple-finger mode. Depending on the answer from the user through the touch panel 113, the marked finger may be changed in the single finger mode, or the finger marker may be attached to both of an originally marked finger and a currently touching finger in the multiple-finger mode.

Other Embodiments

Although the present disclosure has been fully described in connection with preferred embodiment thereof with reference to the accompanying drawings, it is to be noted that various changes and modifications will become apparent to those skilled in the art.

Figure 35:
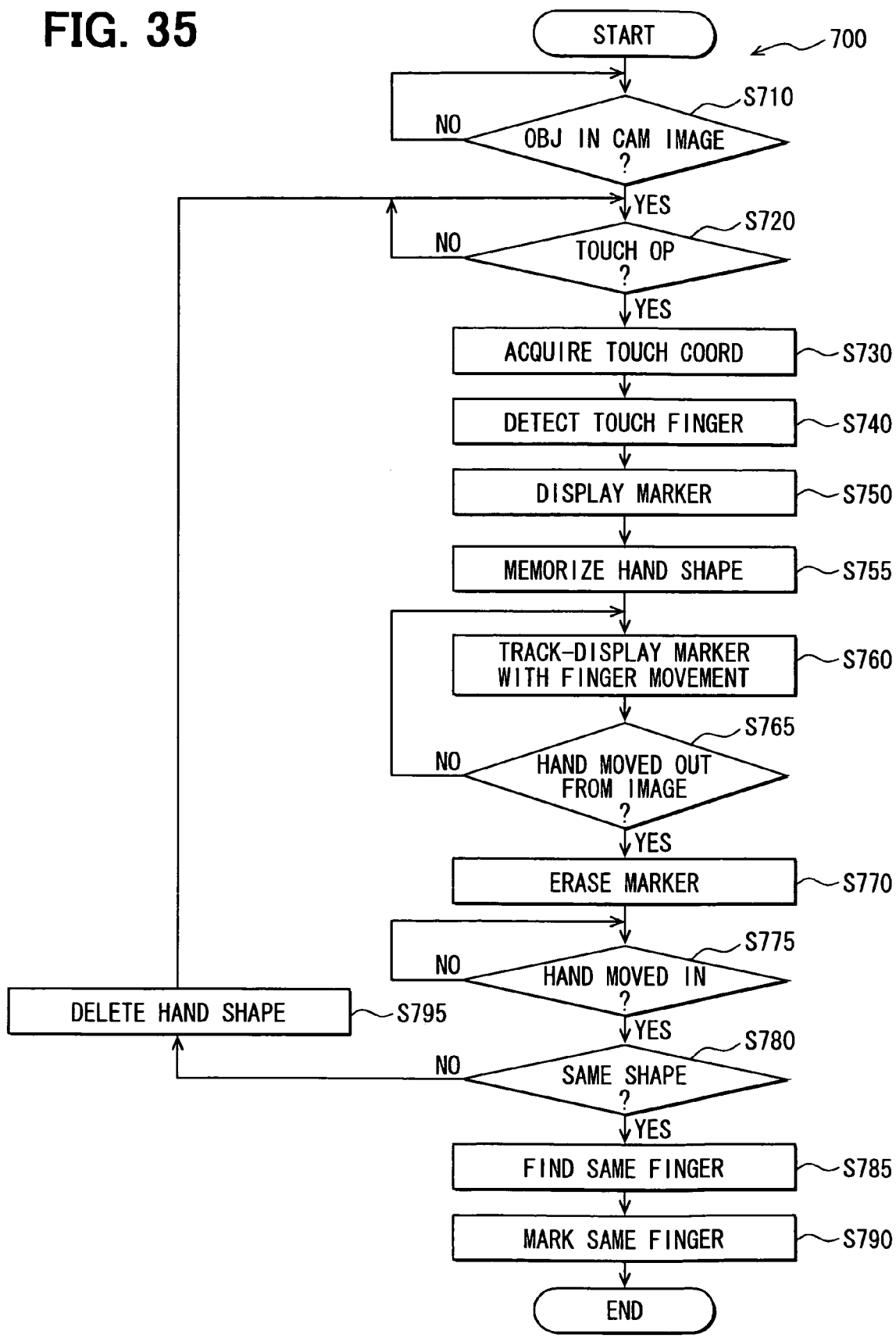
FIG. 35 is a flow chart of still yet another finger mark process performed by the signal processor in a tenth embodiment of the present invention.

For example, in the tenth embodiment, the signal processor 120 may, in S770, erase the memorized contents that have been memorized in S755 in the course of execution of the program 700 in FIG. 35 when it is determined that the hand has exited from the photography range in S765. In other words, the signal processor 120 may, based on the exit of the hand from the photography range of the camera 114 on the touch panel 113, de-select the marking object finger. In addition, S780 may be succeeded unconditionally by S720 when the memorized contents of step 755 are erased.

When the hand exits from the photography range, the hand subsequently entering the photography range may be a hand of a different person. Therefore, by de-selecting the marking object finger based on the exit of the hand from the photography range, the possibility for providing the finger marker for the same position of the different person's hand is suppressed.

Further, in the tenth embodiment, the signal processor 120 determines whether the finger image exits from the photography range in S765 of FIG. 35. However, it may be determined whether a finger portion exits from the photography range in S765. In that case, in S780, if the palm portion stays in the photography range while the finger portion is exiting from the range and returning to the range, the process may proceed to S785, or otherwise proceed to S795. This is because it is highly possible that the fingers returning to the photography range are the same fingers that have exited from the photography range if the palm portion stays in the photography range.

Furthermore, in S780, an exiting direction of the fingers from the photography range in S765 and a returning direction of the fingers in S775 may be compared, and S795 may be subsequently executed if the angle between the two directions is equal to or greater than a reference angle (e.g., 90 degrees), or S785 may be alternatively executed if the angle between the two directions is smaller than the reference angle. That is, in other words, the same finger is selected as the marking object finger only when the hand is determined to be returning from the same direction as the exiting direction. This is because it is highly possible that the two fingers belong to respectively different persons if the finger exits in one direction, and then returns from an opposite side of the exiting direction (e.g., a driver's finger and a navigator's finger).

Furthermore, it may be determined whether there are two or more occupants in the vehicle, or only one occupant, in S780 based on a signal from the seat sensor 116. If there are two or more occupants, S795 may be subsequently executed, or if there is only one occupant, S785 may be executed. That is, in other words, based on the information from the seat sensor 116, the same finger is continuously selected as the marking object finger if there is only one occupant in the vehicle.

This is based on an assumption that it is highly possible that, if there is only one occupant in the vehicle, the hand belongs to the same person even when the hand is returning to the photography range after exiting from the range.

In this case, the signal processor 120 may select a new marking object finger based on the recorded positional relationship of the marking object finger and the recorded hand shape, if the multiple fingers in the hand image return to the photography range of the camera 114 in the touch panel 113 after exiting from it.

In this manner, the marking object finger needs not be re-selected for the same hand even when the marking finger exits from the photography range.

In addition, data that is required to be updated such as the characteristic information of the finger shape and the like may be stored, besides the storage medium of the DB 118, in a storage medium that can retain the data even when a main power supply of the navigation apparatus 101 is stopped (e.g., a flash memory, an EEPROM, a backup RAM). In that case, the storage medium of the DB 118 may be a read-only storage medium such as such as a DVD, a CD-ROM and the like, instead of the writable medium such as the hard disk drive or the like.

Furthermore, each of the functions realized by the execution of the programs in the signal processor 120 may be implemented by using hardware such as a FPGA, which, for example, can program a circuit configuration).

Furthermore, in the above embodiments, the navigation apparatus 101 is shown as an example of the operating hand projection apparatus. However, the operating hand projection apparatus may not be disposed in the vehicle. That is, in other words, the operating hand projection apparatus is sufficiently functional if the apparatus has the claimed elements.

Such changes, modifications, and summarized scheme are to be understood as being within the scope of the present disclosure as defined by appended claims.

What is claimed is:

1. An operating object extraction apparatus for use in a vehicle, the apparatus comprising:
a display unit for displaying various images;
an operation panel for receiving operation of an operator, wherein the operation panel is separately disposed from the display unit for providing a remote control;
a control unit for generating a finger image on the display unit based on an operator finger captured by a camera on the operation panel, wherein the control unit controls a ratio A of the operator finger against a panel size of the operation panel to be greater than a ratio B of the finger image against a size of the display unit, and
a plurality of lighting units for respectively differently lighting the operator finger,
wherein
the camera is disposed under the operation panel to be arranged to capture one of an upside and a proximity of the upside of the operation panel,
the plurality of lighting units are disposed under the operation panel, and are arranged to light the operator finger on one of the upside and the proximity of the upside of the operation panel,
the plurality of lighting units light the operator finger from a lower left side and a lower right side,
the exposure controller controls the plurality of lighting units to light the operator finger only from the lower left side for a first finger image captured by the camera, and to light the operator finger only from the lower right side of a second finger image captured by the camera,
the image generator extracts a common part from the first and second finger images by comparing two finger images, and
the control unit includes:
an exposure controller for controlling the lighting by the plurality of lighting units; and
an image generator for generating the finger image to be displayed on the display unit based on at least two differently lit finger images derived from the different lighting by the plurality of lighting units.

2. An operating object extraction apparatus for use in a vehicle, the apparatus comprising:
a display unit for displaying various images;
an operation panel for receiving operation of an operator, wherein the operation panel is separately disposed from the display unit for providing a remote control;
a control unit for generating a finger image on the display unit based on an operator finger captured by a camera on the operation panel, wherein the control unit controls a ratio A of the operator finger against a panel size of the operation panel to be greater than a ratio B of the finger image against a size of the display unit; and
a plurality of lighting units for respectively differently lighting the operator finger, wherein
the control unit includes:
an exposure controller for controlling the lighting by the plurality of lighting units; and
an image generator for generating the finger image to be displayed on the display unit based on at least two differently lit finger images derived from the different lighting by the plurality of lighting units,
the camera is disposed to be arranged to capture an opposite side of the operator finger relative to an externally-lighted side of the operator finger,
the plurality of lighting units light the operator finger from a lower left side and a lower right side,
the exposure controller controls the plurality of lighting units to light the operator finger only from the lower left side for a first finger image captured by the camera, and to light the operator finger only from the lower right side of a second finger image captured by the camera,
the image generator extracts a common part from the first and second finger images by comparing two finger images, and
the image generator binarises the first and second finger images based on respectively different brightness values for extracting the common part from the two finger images.

3. An operating object extraction apparatus for use in a vehicle, the apparatus comprising:
a display unit for displaying various images;
an operation panel for receiving operation of an operator, wherein the operation panel is separately disposed from the display unit for providing a remote control;
a control unit for generating a finger image on the display unit based on an operator finger captured by a camera on the operation panel, wherein the control unit controls a ratio A of the operator finger against a panel size of the operation panel to be greater than a ratio B of the finger image against a size of the display unit; and
a plurality of lighting units for respectively differently lighting the operator finger, wherein
the control unit includes:
an exposure controller for controlling the lighting by the plurality of lighting units; and
an image generator for generating the finger image to be displayed on the display unit based on at least two differently lit finger images derived from the different lighting by the plurality of lighting units,
the camera is disposed to be arranged to capture an opposite side of the operator finger relative to an externally-lighted side of the operator finger,
the plurality of lighting units light the operator finger from a lower left side and a lower right side,
the exposure controller controls the plurality of lighting units to light the operator finger only from the lower left side for a first finger image captured by the camera, and to light the operator finger only from the lower right side of a second finger image captured by the camera,
the image generator extracts a common part from the first and second finger images by comparing two finger images,
the exposure controller sets a predetermined cycle for a capture timing of the camera, and
the lighting from the lower left side and the lighting from the lower right side alternate at each of the capture timing.

4. An operating object extraction apparatus for use in a vehicle, the apparatus comprising:
a display unit for displaying various images;
an operation panel for receiving operation of an operator, wherein the operation panel is separately disposed from the display unit for providing a remote control;
a control unit for generating a finger image on the display unit based on an operator finger captured by a camera on the operation panel, wherein the control unit controls a ratio A of the operator finger against a panel size of the operation panel to be greater than a ratio B of the finger image against a size of the display unit; and
a plurality of lighting units for respectively differently lighting the operator finger, wherein the control unit includes:
- an exposure controller for controlling the lighting by the plurality of lighting units; and
- an image generator for generating the finger image to be displayed on the display unit based on at least two differently lit finger images derived from the different lighting by the plurality of lighting units, the camera is disposed to be arranged to capture an opposite side of the operator finger relative to an externally-lighted side of the operator finger, the plurality of lighting units light the operator finger from a lower left side and a lower right side, the exposure controller controls the plurality of lighting units to light the operator finger only from the lower left side for a first finger image captured by the camera, and to light the operator finger only from the lower right side of a second finger image captured by the camera, and to have the operator finger in a third finger image lit neither from the lower left side nor from the lower right side, and the image generator generates the finger image to be displayed on the display unit based on the first, second and third finger images.

5. The operating object extraction apparatus of claim 4, wherein
the image generator differentiates the brightness between the first finger image and the third image at a corresponding portion for acquiring a first binarized difference image based on the predetermined binarising brightness, and
the image generator differentiates the brightness between the second finger image and the third image at a corresponding portion for acquiring a second binarized difference image.

6. The operating object extraction apparatus of claim 4, wherein
the exposure controller sets a predetermined cycle for a capture timing of the camera, and
the exposure controller synchronizes an image capture timing serially at a timing of lighting from the lower left side, a timing of lighting from the lower right side, and a timing of no-lighting from either of the lower left side or lower right side.

7. The operating object extraction apparatus of claim 4, wherein
the exposure controller sets a predetermined cycle for a capture timing of the camera, and
the exposure controller synchronizes an image capture timing serially at a timing of lighting from one of the lower left side and the lower right side, a timing of no-lighting from one of the lower left side and the lower right side, a timing of lighting from the other of the lower left side and the lower right side, and a timing of no-lighting from the other of the lower left side and the lower right side.

8. An operating hand projection apparatus comprising:
a touch panel separately disposed from a display unit for receiving an input of a position on a screen of the display unit;
a camera for imaging a hand that is held at a proximity of a touch surface of the touch panel; and
a display controller for displaying, in an operation reception image on the display unit, a hand image derived from the camera in a superposing manner, wherein
the display controller selects one of a plurality of fingers in the hand image derived from the camera as a marker finger, and
the marker finger selected by the display controller is marked directly by a selection mark at a tip of the finger in the hand image.

9. The operating hand projection apparatus of claim 8, wherein
the display controller selects, as the maker finger, a first finger that first touches the touch panel from among the plurality of fingers in the hand image after the camera starts imaging of the hand.

10. The operating hand projection apparatus of claim 8, wherein
the operation reception image has an effective area that changes display contents due to the input from the touch panel and a non-effective area that does not change the display contents due to the input from the touch panel, and
the display controller selects, as the marker finger, a first finger that touches a position in the effective area of the touch panel from among the plurality of fingers after the camera starts imaging the hand in the proximity of the touch surface.

11. The operating hand projection apparatus of claim 8, wherein
the display controller selects, as the marker finger, a finger that touches the touch panel for a number of times that is at least two and is equal to or greater than a certain standard number from among the plurality of fingers.

12. The operating hand projection apparatus of claim 8 wherein
the display controller selects, as the marker finger, a finger that touches a position of the touch panel corresponding to a marker finger selection area in the operation reception image touch panel from among the plurality of fingers.

13. The operating hand projection apparatus of claim 8, wherein
the operation reception image has an effective area that changes display contents due to the input from the touch panel and a non-effective area that does not change the display contents due to the input from the touch panel, and
the display controller selects, as the marker finger, a finger that touches a position on the touch panel corresponding to the non-effective area for a time that is equal to or greater than a first threshold time from among the plurality of fingers.

14. The operating hand projection apparatus of claim 8 further comprising a hard key that can be mechanically pressed down, wherein
the display controller selects, as the marker finger, a first finger that first touches the touch panel after the hard key is pressed down.

15. The operating hand projection apparatus of claim 8, wherein
the display controller selects, as the marker finger, a finger that is held above a certain area of the touch panel for a time that is at least equal to a second threshold time.

16. The operating hand projection apparatus of claim 8, wherein
the display controller determines whether a plurality of fingers or a single finger is selected as the marker finger according to a user operation.

17. The operating hand projection apparatus of claim 8 further comprising a storage unit in the display controller for storing characteristics of a hand shape or a relation of the marker finger among the plurality of fingers, wherein the display controller determines similarity of a hand in a current hand image with a hand in a previous hand image based on the characteristics stored in the storage unit, and the display controller selects a new marker finger according to the relation of the marker finger when the hand in the current image is determined to be similar to the hand in the previous image.

18. The operating hand projection apparatus of claim 8, wherein the display controller de-selects the marker finger when the hand goes out from imaging area of the camera.

19. The operating hand projection apparatus of claim 8, wherein the apparatus is disposed in a vehicle, the apparatus is used in combination with a seat sensor that detects seating of each seat in the vehicle, the display controller has a storage unit for storing characteristics of a hand shape or a relation of the marker finger among the plurality of fingers, the display controller determines whether a number of occupants in the vehicle is only one or at least two based on a detection result of the seat sensor, the display controller selects a new marker finger in a current hand image based on the relation of the marker finger stored in the storage unit when the number of occupants in the vehicle is only one, and the display controller deletes the relation of the marker finger from the storage unit when the number of occupants in the vehicle is at least two.

20. The operating hand projection apparatus of claim 8, wherein the selection mark is a cross shape marker.

21. The operating hand projection apparatus of claim 8, wherein the selection mark is a cross shape marker at only the one of a plurality of fingers in the hand image to indicate the one of the plurality of fingers to use.

22. The operating hand projection apparatus of claim 8, wherein the selection mark is at only the one of a plurality of fingers in the hand image to indicate the one of the plurality of fingers to use.

* * * * *